United States Patent
Kimura

(10) Patent No.: US 11,306,201 B2
(45) Date of Patent: Apr. 19, 2022

(54) RUBBER COMPOSITION FOR TIRES AND TIRE

(71) Applicant: BRIDGESTONE CORPORATION, Tokyo (JP)

(72) Inventor: Madoka Kimura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 68 days.

(21) Appl. No.: 16/881,141

(22) Filed: May 22, 2020

(65) Prior Publication Data

US 2020/0283613 A1   Sep. 10, 2020

Related U.S. Application Data

(63) Continuation of application No. PCT/JP2018/032871, filed on Sep. 5, 2018.

(51) Int. Cl.
*C08F 36/08* (2006.01)
*C08L 9/00* (2006.01)
*C08L 47/00* (2006.01)

(52) U.S. Cl.
CPC .............. *C08L 47/00* (2013.01); *C08F 36/08* (2013.01); *C08L 9/00* (2013.01); *C08L 2205/025* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 2014/0005320 A1 | 1/2014 | Weingart et al. | |
| 2019/0153123 A1* | 5/2019 | Yamagata | C08C 19/00 |

FOREIGN PATENT DOCUMENTS

| | | | | |
|---|---|---|---|---|
| JP | 60-255838 | A | 12/1985 | |
| JP | 62-207342 | A | 9/1987 | |
| JP | 2005-041975 | A | 2/2005 | |
| JP | 2006-257254 | A | 9/2006 | |
| JP | 2008-174638 | A | 7/2008 | |
| JP | 2012-219181 | A | 11/2012 | |
| JP | 2014-507525 | A | 3/2014 | |
| JP | 2016-113496 | A | 6/2016 | |
| WO | 2015/145511 | A1 | 10/2015 | |
| WO | WO-2015145511 | A1 * | 10/2015 | C08L 23/28 |
| WO | 2017/195634 | A1 | 11/2017 | |
| WO | WO-2017195634 | A1 * | 11/2017 | C08C 19/00 |

OTHER PUBLICATIONS

International Search Report for PCT/JP2018/032871, dated Nov. 20, 2018.

* cited by examiner

*Primary Examiner* — Richard A Huhn
(74) *Attorney, Agent, or Firm* — Sughrue Mion, PLLC

(57) ABSTRACT

Provided are a rubber composition for tires having excellent low fuel consumption and having crack resistance and tear resistance, which contains a rubber component (A) containing a synthetic isoprene having a weight-average molecular weight (Mw) of 800,000 or more, a molecular weight distribution (Mw/Mn) of 2.5 or less, and a cis-1,4-bond content of 96% or more, a carbon black (B), and a specific carbon black dispersant (C); and a tire using the rubber composition.

14 Claims, No Drawings

RUBBER COMPOSITION FOR TIRES AND TIRE

TECHNICAL FIELD

The present invention relates to a rubber composition for tires, and to a tire.

BACKGROUND ART

Coupled with movements toward global carbon dioxide emission control associated with the recent social demand for energy-saving and with the increase in interest in environmental problems, demands for low fuel consumption by automobiles are being severer. For satisfying such demands, reduction in rolling resistance as tire performance is desired. Methods for reducing rolling resistance of tires are being investigated from various angles, and the methods by an optimization of the tire structure are being investigated, and for example, as a most general method, use of a rubber composition having a low heat generation property is investigated.

As a method of using a material having a low heat generation property as a rubber composition, for example, there are known a method of modifying the polymerization active terminal of a conjugated diolefin-vinyl aromatic hydrocarbon random copolymer with a tin halide compound (e.g., see PTL 1), and a method of using a copolymer produced by reacting a predetermined aromatic vinyl compound-conjugated diene copolymer and an amino group-having compound (e.g., see PTL 2).

CITATION LIST

Patent Literature

PTL 1: JP 60-255838 A
PTL 2: JP 62-207342 A

SUMMARY OF INVENTION

Technical Problem

With the recent increase in the performance demand for tires, properties such as crack resistance and tear resistance are being desired in addition to low fuel consumption through reduction in rolling resistance. However, the methods described in the above-mentioned PTLs 1 and 2 could not still satisfy both these performance demands, and further improvement is desired.

The present invention has been made in consideration of such situations, and is to provide a rubber composition for tires and a tire satisfying excellent low fuel consumption and having crack resistance and tear resistance.

Solution to Problem

As a result of assiduous studies, the present inventor has found that the above-mentioned problems can be solved by the invention having the following constitution.
1. A rubber composition for tires, containing a rubber component (A) that contains a synthetic isoprene having a weight-average molecular weight (Mw) of 800,000 or more, a molecular weight distribution (Mw/Mn) of 2.5 or less, and a cis-1,4-bond content of 96% or more, a carbon black (B), and a carbon black dispersant (C) of at least one selected from a compound represented by any of the following general formulae (1) to (6), and a salt, a solvate and a solvate of the salt of a compound represented by the following general formula (5):

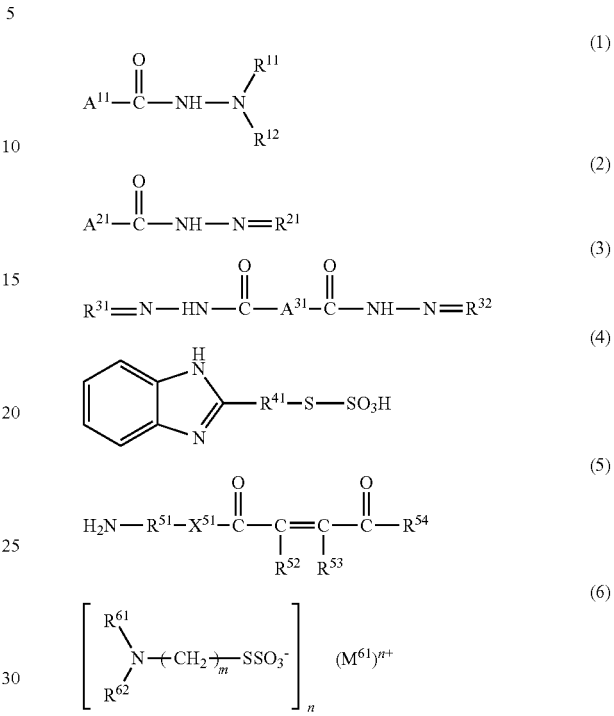

In the general formula (1), $A^{11}$ represents an aryl group, a hydantoin skeleton-having group or a linear hydrocarbon group with 1 to 18 carbon atoms, which may have at least one polar group; $R^{11}$ and $R^{12}$ each independently represent a hydrogen atom, an acyl group, an amide group, an alkyl group, a cycloalkyl group or an aryl group.

In the general formula (2), $A^{21}$ represents an aryl group, a hydantoin skeleton-having group or a linear hydrocarbon group with 1 to 18 carbon atoms, which may have at least one polar group; $R^{21}$ represents an alkanediyl group, a cycloalkanediyl group or an arenediyl group.

In the general formula (3), $A^{31}$ represents an arenediyl group, a hydantoin skeleton-having group or a linear hydrocarbon group with 1 to 18 carbon atoms, which may have at least one polar group; $R^{31}$ and $R^{32}$ each independently represent an alkanediyl group, a cycloalkanediyl group or an arenediyl group.

In the general formula (4), $R^{41}$ represents an alkanediyl group with 1 to 6 carbon atoms.

In the general formula (5), $R^{51}$ represents an alkanediyl group with 1 to 12 carbon atoms, a cycloalkanediyl group with 3 to 12 carbon atoms, or $-B^{51}-A^{51}-B^{52}-$; $A^{51}$ represents an arenediyl group with 6 to 12 carbon atoms; $B^{51}$ and $B^{52}$ each independently represent a single bond or an alkanediyl group with 1 to 12 carbon atoms; $R^{52}$ and $R^{53}$ each independently represent a hydrogen atom, a halogen atom, an alkyl group with 1 to 6 carbon atoms, an aryl group with 6 to 12 carbon atoms, a hydroxy group, or an alkoxy group with 1 to 6 carbon atoms, or bonding to each other to form a cyclic structure; $R^{54}$ represents a hydroxy group, an alkoxy group with 1 to 6 carbon atoms, an aryloxy group with 6 to 12 carbon atoms, an arylalkoxy group with 7 to 15 carbon atoms, $-NR^{55}R^{56}$ or $-O-((Y^{51})^{n+})^{1/n}$; $R^{55}$ and $R^{56}$ each independently represent a hydrogen atom, an alkyl group with 1 to 6 carbon atoms, or an aryl group with 6 to 12 carbon atoms; $(Y^{51})^{n+}$ represents an n-valent cation capable of forming a carboxylate salt; and $X^{51}$ represents —NH— or —O—.

In the general formula (6), $R^{61}$ and $R^{62}$ each independently represent a hydrogen atom or an alkyl group with 1 to 6 carbon atoms, or bonding to each other to form a cyclic structure; $(M^{61})^{n+}$ represents $H^+$ or an n-valent metal ion; m represents an integer of 2 to 9; and n represents an integer of 1 or 2.

2. The rubber composition for tires according to the above (1), wherein the content of components having a molecular weight of less than 200,000 in the synthetic isoprene is less than 10% by mass.

3. The rubber composition for tires according to the above (1) or (2), wherein the content of the synthetic isoprene in the rubber component (A) is 30% by mass or more and 100% by mass or less.

4. The rubber composition for tires according to any one of the above (1) to (3), wherein the content of the carbon black (B) is 20 parts by mass or more and 100 parts by mass or less relative to 100 parts by mass of the rubber component (A).

5. The rubber composition for tires according to any one of the above (1) to (4), wherein the carbon black dispersant (C) is at least one selected from the compounds represented by the general formulae (1) to (3).

6. The rubber composition for tires according to the above (5), wherein, in the general formulae (1) to (3), $A^{11}$ and $A^{21}$ each are independently an aryl group having at least one polar group, and $A^{31}$ is an arenediyl group.

7. The rubber composition for tires according to the above (6), wherein the polar group in the general formulae (1) to (3) is a group selected from an amino group, a hydroxy group and a nitro group.

8. The rubber composition for tires according to the above (5) to (7), wherein, in the general formulae (1) to (3), $R^{11}$ and $R^{12}$ each are independently a hydrogen atom or an alkyl group, $R^{21}$ is an alkanediyl group, and $R^{31}$ and $R^{32}$ each are independently an alkanediyl group.

9. The rubber composition for tires according to any one of the above (1) to (8), wherein the content of the carbon black dispersant (C) is 0.1 parts by mass or more and 10 parts by mass or less relative to 100 parts by mass of the rubber component (A).

10. A tire using a rubber composition of any one of the above (1) to (8).

Advantageous Effects of Invention

According to the present invention, there can be provided a rubber composition for tires and a tire satisfying excellent low fuel consumption and having crack resistance and tear resistance.

DESCRIPTION OF EMBODIMENTS

Hereinunder the present invention is described in detail with reference to embodiments thereof. In the following description, the numeral values of the upper limit and the lower limit of "or more", "or less", or "to" relating to the description of a numerical value range are numerical values that can be combined in any desired manner, and the numerical values in Examples can be the upper limit and the lower limit.

[Rubber Composition for Tires]

The rubber composition for tires of the present invention contains a rubber component (A) that contains a synthetic isoprene having a weight-average molecular weight (Mw) of 800,000 or more, a molecular weight distribution (Mw/Mn) of 2.5 or less, and a cis-1,4-bond content of 96% or more, a carbon black (B), and a specific carbon black dispersant (C).

In the present invention, a rubber component (A) that contains the above-mentioned specific isoprene, a carbon black (B) and a specific carbon black dispersant (C) are combined to give a rubber composition excellent in low fuel consumption and having crack resistance and tear resistance. Specifically, by combining a carbon black and such a synthetic isoprene having a high weight-average molecular weight (Mw) of 800,000 or more and having a narrow molecular weight distribution (Mw/Mn) of 2.5 or less, a larger amount of a bound rubber of an isoprene having a higher molecular weight and a carbon black can be formed, and therefore the resultant composition can have excellent crack resistance and tear resistance, and in addition, using such a synthetic isoprene having a large cis-1,4-bond content of 96% or more, crack resistance and tear resistance can be improved more. Further, using together with a specific carbon black dispersant (C), heat generation by the rubber composition can be suppressed and rolling resistance of tires can be reduced to attain excellent low fuel consumption. Accordingly, the rubber composition for ties of the present invention has excellent low fuel consumption and has crack resistance and tear resistance.

<<Rubber Component (A)>>

The rubber composition for tires of the present invention contains a rubber component (A) that contains a synthetic isoprene having a weight-average molecular weight (Mw) of 800,000 or more, a molecular weight distribution (Mw/Mn) of 2.5 or less, and a cis-1,4-bond content of 96% or more. In this description, "synthetic isoprene" means a homopolymer of isoprene produced through polymerization of isoprene as a monomer, or a copolymer of isoprene and some other monomer than isoprene, and includes such a one produced by modifying a part of the polymer chain of the polymer.

From the viewpoint of attaining more excellent crack resistance and tear resistance, the weight-average molecular weight (Mw) of the synthetic isoprene is preferably 1,000,000 or more, more preferably 1,250,000 or more, even more preferably 1,500,000 or more, and the upper limit thereof is, though not specifically limited but in consideration of easy availability, preferably 5,000,000 or less, more preferably 4,000,000 or less, even more preferably 3,000,000 or less.

From the viewpoint of attaining more excellent crack resistance and tear resistance, the molecular weight distribution (Mw/Mn) of the synthetic isoprene is preferably 2.4 or less, more preferably 2.3 or less, even more preferably 2.1 or less, and the lower limit thereof is, though not specifically limited, preferably 1.0 or more, and is, in consideration of easy availability, preferably 1.1 or more. The synthetic isoprene for use in the present invention has a high weight-average molecular weight (Mw) and a narrow molecular weight distribution (Mw/Mn), and as described above, a larger amount of bound rubber of an isoprene having a higher molecular weight and a carbon black can be formed to realize excellent crack resistance and tear resistance. In this description, the weight-average molecular weight (Mw) and the molecular weight distribution (Mw/Mn) are values calculated through gel permeation chromatography (GPC) based on polystyrene as a standard substance.

In the synthetic isoprene for use in the present invention, preferably, the content of components having a molecular weight of less than 200,000 is less than 10% by mass. When the content of components having a low molecular weight is smaller, a larger amount of bound rubber of an isoprene having a higher molecular weight and a carbon black can be formed to realize excellent crack resistance and tear resistance. From the same viewpoint, the content of components having a molecular weight of less than 200,000 is more preferably 8% by mass or less, even more preferably 6% by mass or less, and especially preferably 5% by mass or less.

From the viewpoint of attaining more excellent crack resistance and tear resistance, the cis-1,4-bond content in the synthetic isoprene is preferably 97% or more, more preferably 98% or more. In this description, the cis-1,4 bond content is a numerical value to be determined through integration ratio from measurement results in $^1$H-NMR and $^{13}$C-NMR. In the case where the synthetic isoprene is an isoprene copolymer, the cis-1,4 bond content therein is a content in the isoprene-derived part and does not mean a content relative to the whole isoprene copolymer.

The synthetic isoprene for use in the present invention may be, as described above, a homopolymer of isoprene, or a copolymer of isoprene and some other monomer. The other monomer to be combined with isoprene is not specifically limited, and may be any monomer capable of forming a copolymer with isoprene, and preferred examples thereof include conjugated diene compounds such as 1,3-butadiene, 1,3-pentadiene, and 2,3-dimethylbutadiene; aromatic vinyl compounds such as styrene; and non-conjugated olefin compounds such as ethylene, propylene, various butenes of 1-butene, 2-butene (including cis-form and trans-form), and isobutene (hereinunder the word "various" may be used to include linear, branched and cyclic forms and isomers thereof), various pentens, various hexens, various heptens, and various octenes. One alone or plural kinds of these other monomers can be used either singly or as combined.

In the present invention, in the case of using a copolymer of isoprene and some other monomer, in consideration of easiness in molecular weight control, the other monomer is preferably 1,3-butadiene or styrene. In this case, from the viewpoint of attaining the advantageous effects of the present invention, the proportion of the other monomer is preferably 20 mol % or less, more preferably 10 mol % or less, and is, in consideration of attaining more excellent crack resistance and tear resistance, preferably 0 mol %, that is, no use of the other monomer is preferred.

The rubber component (A) may contain some other rubber component than the above-mentioned synthetic isoprene. Not specifically limited, the other rubber component may be appropriately selected as needed, and examples thereof include natural rubber (NR), butadiene rubber (BR), styrene-butadiene rubber (SBR), acrylonitrile-butadiene rubber (NBR), chloroprene rubber, ethylene-propylene rubber (EPM), ethylene-propylene-non-conjugated diene rubber (EPDM), polysulfide rubber, silicone rubber, fluororubber, and urethane rubber. One alone or plural kinds of these other rubber components may be used either singly or as combined.

The other rubber component preferably contains natural rubber (NR), butadiene rubber (BR) or styrene-butadiene rubber (SBR), more preferably butadiene rubber (BR) or styrene-butadiene rubber (SBR), and especially more preferably butadiene rubber (BR).

The synthetic isoprene content in the rubber component (A) is preferably 30% by mass or more and 100% by mass or less, more preferably 40% by mass or more, and even more preferably 50% by mass or more. When the synthetic isoprene content falls within the above-mentioned range, the effect of using the synthetic isoprene is secured efficiently.

(Production Method for Synthetic Isoprene)

The synthetic isoprene for use in the present invention can be produced, for example, according to the following production method.

The synthetic isoprene can be produced through a polymerization step of using isoprene alone as a monomer or using isoprene and, as needed, some other monomer than isoprene and polymerizing then under the presence of a polymerization catalyst or a polymerization catalyst composition. Also as needed, the production method may include a coupling step, a washing step and any other step along with the polymerization step.

(Polymerization Step)

The polymerization step is a step of polymerizing isoprene alone as a monomer, or isoprene and, as needed, any other monomer than isoprene. In the polymerization step, the monomer may be polymerized in the same manner as that for a production method for a polymer with an ordinary coordinated ionic polymerization catalyst, but in consideration of easiness in controlling the weight-average molecular weight (Mw), the molecular weight distribution (Mw/Mn) and the cis-1,4 bond content to fall within the above-mentioned ranges, at least one polymerization catalyst composition selected from a first polymerization catalyst composition, a second polymerization catalyst composition, a third polymerization catalyst composition and a fourth polymerization catalyst composition to be described below is preferably used in polymerizing the monomer.

As the polymerization method, any method of a solution polymerization method, a suspension polymerization method, a liquid-phase bulk polymerization method, an emulsion polymerization method, a vapor-phase polymerization method or a solid-phase polymerization method can be used. In the case of using a solvent in polymerization reaction, such a solvent may be any one inactive in polymerization reaction, and examples thereof include toluene, cyclohexane, and normal hexane. One alone or plural kinds of these solvents may be used either singly or as combined.

In the case where a polymerization catalyst composition is used in the polymerization step, for example, (1) constituent components of the polymerization catalyst component may be separately added to the polymerization reaction system containing isoprene as a monomer to prepared a polymerization catalyst composition in the reaction system, or (2) a previously prepared polymerization catalyst composition may be added to the polymerization reaction system. The above (2) includes adding a metallocene complex (active species) activated with a co-catalyst.

In the polymerization step, a polymerization terminator such as methanol, ethanol or 2-propanol may be used to stop polymerization.

The polymerization reaction of a monomer including isoprene is preferably carried out in an atmosphere of an inert gas such as nitrogen gas or argon gas.

The polymerization temperature in the polymerization reaction is, though not specifically limited, for example, preferably within a range of −100° C. or higher and 200° C. or lower, and may be room temperature (22° C.) or so. From the viewpoint of increasing the cis-1,4 bond selectivity in the polymerization reaction, the polymerization temperature is more preferably within a range of −50° C. or higher and 100° C. or lower.

For the purpose of sufficiently taking a conjugated diene compound into the polymerization reaction system, the pressure for the polymerization reaction is preferably within a range of 0.1 to 10.0 MPa. The reaction time for the polymerization reaction is not also specifically limited, and may be appropriately selected depending on the conditions such as the type of the catalyst used and the polymerization temperature, and is, for example, preferably within a range of 1 second to 10 days.

Next, the first polymerization catalyst composition, the second polymerization catalyst composition, the third polymerization catalyst composition and the fourth polymerization catalyst composition that are polymerization catalyst compositions preferably used in the polymerization step are described.

(First Polymerization Catalyst Composition)

The first polymerization catalyst composition is preferably a polymerization catalyst composition containing at least one complex selected from a metallocene complex represented by the following general formula ($i_1$):

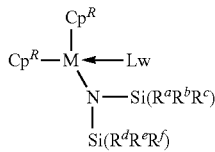

(i₁)

wherein M represents a lanthanoid element, scandium or yttrium; $Cp^R$ represents a unsubstituted or substituted indenyl; $R^a$ to $R^f$ each independently represent a hydrogen atom, or an alkyl group with 1 to 3 carbon atoms; L represents a neutral Lewis base; w represents an integer of 0 to 3; and plural $Cp^R$'s may the same or different;
a metallocene complex represented by the following general formula ($ii_1$):

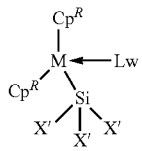

(ii₁)

wherein M represents a lanthanoid element, scandium or yttrium; $Cp^R$ represents a unsubstituted or substituted indenyl; X' represents a hydrogen atom, a halogen atom, an alkoxy group, a thiolate group, an amino group, a silyl group or a hydrocarbon group with 1 to 20 carbon atoms; L represents a neutral Lewis base; w represents an integer of 0 to 3; and plural $Cp^R$'s and X's each may the same or different;
and a half-metallocene cation complex represented by the following general formula ($iii_1$):

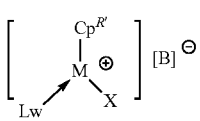

(iii₁)

wherein M represents a lanthanoid element, scandium or yttrium; $Cp^{R'}$ represents a unsubstituted or substituted cyclopentadienyl, indenyl or fluorenyl; X represents a hydrogen atom, a halogen atom, an alkoxy group, a thiolate group, an amino group, a silyl group or a hydrocarbon group with 1 to 20 carbon atoms; L represents a neutral Lewis base; w represents an integer of 0 to 3; [B]⁻ represents a non-coordinating anion.

The first polymerization catalyst composition may further contain any other component that may be contained in polymerization catalyst composition including an ordinary metallocene complex, for example, a co-catalyst. Here, the metallocene complex is a complex compound having one or more cyclopentadienyl groups or derivatives thereof bonding to the center atom therein, and in particular, a metallocene complex having one cyclopentadienyl group or a derivative thereof bonding to the center atom therein may be referred to as a half-metallocene complex.

In the polymerization reaction system, the concentration of the complex contained in the first polymerization catalyst composition is preferably within a range of 0.1 to 0.0001 mol/L.

In the metallocene complexes represented by the above-mentioned general formulae ($i_1$) and ($ii_1$), $Cp^R$ in the general formulae is an unsubstituted indenyl group or a substituted indenyl group.

$Cp^R$ that has an indenyl ring as the basic skeleton may be represented by $C_9H_{7-x}R_x$ or $C_9H_{11-x}R_x$. Here, x is an integer of 0 to 7 or 0 to 11. Preferably, R each independently represents a hydrocarbon group or a metalloid group. The carbon number of the hydrocarbon group is preferably 1 to 20, more preferably 1 to 10, even more preferably 1 to 8. Specifically, preferred examples of the hydrocarbon group include an alkyl group such as a methyl group and an ethyl group, and an aryl group and an aralkyl group such as a phenyl group and a benzyl group. Examples of metalloid of the metalloid group include germyl Ge, stannyl Sn, and silyl Si. Preferably, the metalloid group has a hydrocarbon group, and the hydrocarbon group that the metalloid group has is the same as the above-mentioned hydrocarbon group. Specifically, the metalloid group includes a trimethylsilyl group Specifically, the substituted indenyl group includes 2-phenylindenyl, and 2-methylindenyl. Two $Cp^R$'s in the general formulae ($i_1$) and ($ii_1$) may be the same as or different from each other.

In the half-metallocene cation complex represented by the above general formula ($iii_1$), $Cp^{R'}$ in the general formula is an unsubstituted or substituted cyclopentadienyl, indenyl or fluorenyl group, and among these, an unsubstituted or substituted indenyl group is preferred. $Cp^{R'}$ having a cyclopentadienyl ring as the basic skeleton is represented by $C_5H_{5-x}R_x$. Here, x is an integer of 0 to 5. Preferably, R represents a hydrocarbon group or a metalloid group. The carbon number of the hydrocarbon group is preferably 1 to 20, more preferably 1 to 10, even more preferably 1 to 8. Specifically, preferred examples of the hydrocarbon group include an alkyl group such as a methyl group and an ethyl group, and an aryl group and an aralkyl group such as a phenyl group and a benzyl group. Examples of metalloid of the metalloid group include germyl Ge, stannyl Sn, and silyl Si. Preferably, the metalloid group has a hydrocarbon group, and the hydrocarbon group that the metalloid group has is the same as the above-mentioned hydrocarbon group. Specifically, the metalloid group includes a trimethylsilyl group. Specific examples of $Cp^{R'}$ that has a cyclopentadienyl ring as the basic skeleton include the following:

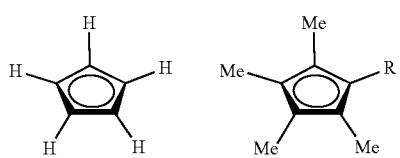

wherein R represents a hydrogen atom, a methyl group or an ethyl group.

In the general formula (iii$_1$), Cp$^{R'}$ that has the above-mentioned indenyl ring as the basic skeleton is defined in the same manner as that for Cp$^R$ in the general formula (i$_1$), and preferred examples thereof are also the same as those of the latter.

In the general formula (iii$_1$), Cp$^{R'}$ that has the above-mentioned fluorenyl ring as the basic skeleton may be represented by $C_{13}H_{9-x}R$ or $C_{13}H_{17-x}R_x$. Here, x represents an integer of 0 to 9, or 0 to 17. Preferably, R each independently represent a hydrocarbon group or a metalloid group. The carbon number of the hydrocarbon group is preferably 1 to 20, more preferably 1 to 10, even more preferably 1 to 8. Specifically, preferred examples of the hydrocarbon group include an alkyl group such as a methyl group and an ethyl group, and an aryl group and an aralkyl group such as a phenyl group and a benzyl group. Examples of metalloid of the metalloid group include germyl Ge, stannyl Sn, and silyl Si. Preferably, the metalloid group has a hydrocarbon group, and the hydrocarbon group that the metalloid group has is the same as the above-mentioned hydrocarbon group. Specifically, the metalloid group includes a trimethylsilyl group.

The center metal M in the general formulae (i$_1$), (ii$_1$) and (iii$_1$) is a lanthanoid element, scandium or yttrium. The lanthanoid element includes fifteen elements of Atomic Numbers 57 to 71, and any of these may be for the metal. Preferred examples of the center metal M include samarium Sm, neodymium Nd, praseodymium Pr, gadolinium Gd, cerium Ce, holmium Ho, scandium Sc and yttrium Y.

The metallocene complex represented by the general formula (i$_1$) includes a silylamide ligand [—N(SiR$_3$)$_2$]. The group R (R$^a$ to R$^f$ in the general formula (i$_1$)) contained in the silylamide ligand each independently represent an alkyl group having 1 to 3 carbon atoms, or a hydrogen atom. Preferably, at least one of R$^a$ to R$^f$ is a hydrogen atom. When at least one of R$^a$ to R$^f$ is a hydrogen atom, catalyst synthesis is easy, and in addition, since the bulkiness around silicon is low, a non-conjugated olefin compound and an aromatic vinyl compound could be readily introduced into the complex. From the same viewpoint, more preferably, at least one of R$^a$ to R$^c$ is a hydrogen atom and at least one of R$^d$ to R$^f$ is a hydrogen atom. Further, the alkyl group is preferably a methyl group.

The metallocene complex represented by the general formula (ii$_1$) contains a silyl ligand [—SiX'$_3$]. X' contained in the silyl ligand [—SiX'$_3$] is a group defined in the same manner as that for X in the general formula (iii$_1$), and preferred examples thereof are also the same as those of the latter.

In the general formula (iii$_1$), X is a group selected from a hydrogen atom, a halogen atom, an alkoxy group, a thiolate group, an amino group, a silyl group and a hydrocarbon group having 1 to 20 carbon atoms. Here, the alkoxy group includes an aliphatic alkoxy group such as a methoxy group, an ethoxy group, various propoxy groups, and various butoxy groups; and an aryloxy group such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group. Among these, a 2,6-di-tert-butylphenoxy group is preferred.

In the general formula (iii$_1$), the thiolate group represented by X includes an aliphatic thiolate group such as a thiomethoxy group, a thioethoxy group, various thiopropoxy groups, and various thiobutoxy group; and an arylthiolate group such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-neopentylthiophenoxy group, a 2-isopropyl-6-neopentylthiophenoxy group, a 2,4,6-triisopropylthiophenoxy group. Among these, a 2,4,6-triisopropylthiophenoxy group is preferred.

In the general formula (iii$_1$), the amino group represented by X includes an aliphatic amino group such as a dimethylamino group, a diethylamino group, and a diisopropylamino group; an arylamino group such as a phenylamino group, a 2,6-di-tert-butylphenylamino group, a 2,6-diisopropylphenylamino group, a 2,6-dineopentylphenylamino group, a 2-tert-butyl-6-isopropylphenylamino group, a 2-tert-butyl-6-neopentylphenylamino group, a 2-isopropyl-6-neopentylphenylamino group, and a 2,4,6-tri-tert-butylphenylamino group; and a bistrialkylsilylamino group such as a bistrimethylsilylamino group. Among these, a bistrimethylsilylamino group is preferred.

In the general formula (iii$_1$), the silyl group represented by X includes a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group. Among these, a tris(trimethylsilyl)silyl group is preferred.

In the general formula (iii$_1$), the halogen atom represented by X may be any of a fluorine atom, a chlorine atom, a bromine atom or an iodine atom, but is preferably a chlorine atom or a bromine atom. Specifically, the hydrocarbon group having 1 to 20 carbon atoms that X represents includes an aliphatic hydrocarbon group such as a linear or branched alkyl group such as a methyl group, an ethyl group, various propyl groups, various butyl groups, various pentyl groups, various hexyl groups and various octyl groups; an aromatic hydrocarbon group such as a phenyl group, a tolyl group and a naphthyl group; an aralkyl group such as a benzyl group; and also a silicon atom-containing hydrocarbon group such as a trimethylsilylmethyl group, and a bistrimethylsilylmethyl group. Among these, a methyl group, an ethyl group, an isobutyl group and a trimethylsilylmethyl group are preferred.

In the general formula (iii$_1$), X is preferably a bistrimethylsilylamino group, or a hydrocarbon group having 1 to 20 carbon atoms.

In the general formula (iii$_1$), examples of the non-coordinating anion represented by [B]— include a tetravalent boron anion. Specifically, the tetravalent boron anion includes a tetraphenylborate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (triphenyl, pentafluorophenyl)borate, a [tris(pentafluorophenyl),phenyl]borate, and a tridecahydride-7,8-dicarbaundecaborate. Among these, a tetrakis(pentafluorophenyl)borate is preferred.

The metallocene complex represented by the above general formulae (i$_1$) and (ii$_1$) and the half-metallocene cation complex represented by the above general formula (ii$_1$) further contain 0 to 3, preferably 0 to 1 neutral Lewis base L. Here, examples of the neutral Lewis base L include tetrahydrofuran, diethyl ether, dimethylaniline, trimethyl phosphine, lithium chloride, neutral olefins, and neutral diolefins. Here, in the case where the complex contains plural neutral Lewis bases L's, the neutral Lewis bases L's may be the same or different.

The metallocene complex represented by the above general formulae ($i_1$) and ($ii_1$) and the half-metallocene cation complex represented by the above general formula ($iii_1$) may exist as a monomer, or may also exist as a dimer or a more multimeric polymer.

The metallocene complex represented by the general formula ($i_1$) can be obtained, for example, by reacting a lanthanoid trishalide, a scandium trishalide or a yttrium trishalide with an indenyl salt (for example, potassium salt or lithium salt) and a bis(trialkylsilyl)amine salt (for example, potassium salt or lithium salt) in a solvent. The reaction temperature may be room temperature or so, and therefore the complex can be produced under a mild condition. Not defined, the reaction time may be a few hours to tens of hours or so. The reaction solvent is not specifically limited, but is preferably a solvent that dissolves starting materials and products, and for example, toluene may be used. A reaction example for producing the metallocene complex represented by the general formula ($i_1$) is shown below.

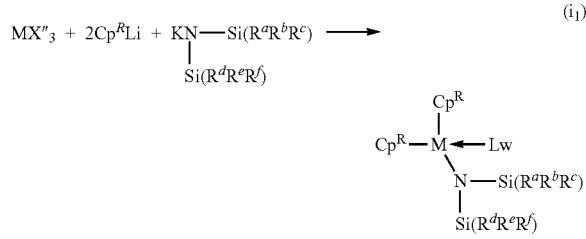

wherein X" represents a halide.

The metallocene complex represented by the general formula ($ii_1$) may be obtained, for example, by reacting a lanthanoid trishalide, a scandium trishalide or a yttrium trishalide with an indenyl salt (for example, potassium salt or lithium salt) and a silyl salt (for example, potassium salt or lithium salt) in a solvent. The reaction temperature may be room temperature or so, and therefore the complex can be produced under a mild condition. Not defined, the reaction time may be a few hours to tens of hours or so. The reaction solvent is not specifically limited, but is preferably a solvent that dissolves starting materials and products, and for example, toluene may be used. A reaction example for producing a metallocene complex represented by the general formula ($ii_1$) is shown below.

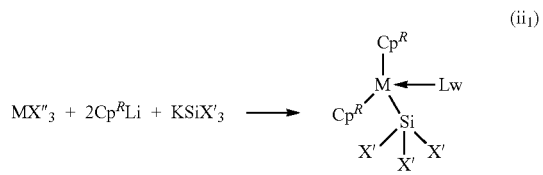

wherein X" represents a halide.

The half-metallocene cation complex represented by the general formula ($iii_1$) may be obtained, for example, according to the following reaction.

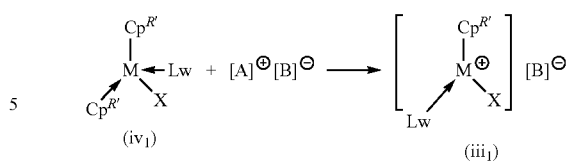

Here, in the compound represented by the general formula ($iv_1$), M represents a lanthanoid element, scandium or yttrium, $Cp^{R'}$ each independently represents an unsubstituted or substituted cyclopentadienyl, indenyl or fluorenyl group, X represents a hydrogen atom, a halogen atom, an alkoxy group, a thiolate group, an amino group, a silyl group, or a hydrocarbon group having 1 to 20 carbon atoms, L represents a neutral Lewis base, w represents an integer of 0 to 3. In the ionic compound represented by the general formula [A]+[B], [A]$^+$ represents a cation, [B]$^-$ represents a non-coordinating anion.

Examples of the cation represented by [A]$^+$ include a carbonium cation, an oxonium cation, an amine cation, a phosphonium cation, a cycloheptatrienyl cation, and a transition metal-having ferrocenium cation.

The carbonium cation includes a tri-substituted carbonium cation such as a triphenylcarbonium cation, and a tri(substituted phenyl)carbonium cation. Specifically, the tri(substituted phenyl)carbonyl cation includes a tri(methylphenyl)carbonium cation. The amine cation includes a trialkylammonium cation such as a trimethylammonium cation, a triethylammonium cation, a tripropylammonium cation, a tributylammonium cation; an N,N-dialkylanilinium cation such as an N,N-dimethylanilinium cation, an N,N-diethylanilinium cation, an N, N, 2, 4, 6-pentamethyl-anilinium cation; and a dialkylammonium cation such as a diisopropylammonium cation, a dicyclohexylammonium cation. The phosphonium cation includes a triarylphosphonium cation such as a triphenylphosphonium cation, a tri(methylphenyl)phosphonium cation, a tri(dimethylphenyl) phosphonium cation. Among these cations, an N,N-dialkylanilinium cation and a carbonium cation are preferred, and an N,N-dialkylanilinium cation is especially preferred.

The ionic compound represented by the general formula [A]+[B]—, which is used in the above-mentioned reaction, is a compound constructed by selectively combining the above-mentioned non-coordinating anion and cation, and N,N-dimethylanilinium tetrakis(pentafluorophenyl)borate, and triphenylcarbonium tetrakis(pentafluorophenyl)borate are preferred. Preferably, the ionic compound represented by the general formula [A]+[B]— is added in an amount of 0.1 to 10 times by mol, more preferably about 1 time by mol to the metallocene complex. In the case where the half-metallocene cation complex represented by the general formula ($iii_1$) is used in the polymerization reaction, the half-metallocene cation complex represented by the general formula ($iii_1$) may be put into the polymerization reaction system as it is, or the compound represented by the general formula ($iv_1$) to be used in the reaction and the ionic compound represented by the general formula [A]$^+$[B]$^-$ may be separately put into the polymerization reaction system to form the half-metallocene cation complex represented by the general formula ($iii_1$) in the reaction system. Alternatively, the metallocene complex represented by the general formula ($i_1$) or ($ii_1$) and the ionic compound represented by [A]$^+$[B]$^-$ may be used as combined so as to form the half-metallocene cation complex represented by the general formula (iii$_1$) in the reaction system.

Preferably, the structure of the metallocene complex represented by the general formulae (i$_1$) and (ii$_1$) and the half-metallocene cation complex represented by the general formula (iii$_1$) is determined through X-ray structural analysis.

The co-catalyst usable in the first polymerization catalyst composition may be arbitrarily selected from components that are usable for a co-catalyst for ordinary metallocene complex-containing polymerization catalyst compositions. Preferred examples of the co-catalyst include aluminoxanes, organic aluminium compounds, and the above-mentioned ionic compounds. One alone or two or more kinds of these co-catalysts may be used either singly or as combined.

The aluminoxane is preferably an alkylaluminoxane, and examples thereof include methylaluminoxane (MAO), and modified methylaluminoxane (MMAO). As the modified methylaluminoxane, MMAO-3A (manufactured by Tosoh Finechem Corporation) is preferred. The content of the aluminoxane in the first polymerization catalyst composition is preferably such that the elemental ratio of the aluminum element Al of the aluminoxane to the center element M of the metallocene complex, Al/M could be 10 to 1,000 or so, more preferably 100 or so.

The organic aluminum compound is preferably an organic aluminum compound represented by a general formula AlRR'R" (where R and R' each independently represent a hydrocarbon group having 1 to 10 carbon atoms, a halogen atom, or a hydrogen atom, R" represents a hydrocarbon group having 1 to 10 carbon atoms). Examples of the halogen atom include a fluorine atom, a chlorine atom, a bromine atom and an iodine atom, and a chlorine atom is preferred. Examples of the organic aluminum compound include a trialkylaluminum, a dialkylaluminum chloride, an alkylaluminum dichloride, and a dialkylaluminum hydride. Among these, a trialkylaluminum is preferred. Examples of the trialkylaluminum include triethylaluminum, and tri-isobutylaluminum. The content of the organic aluminum compound in the polymerization catalyst composition is preferably 1 to 50 times by mol more preferably about 10 times by mol to the metallocene complex therein.

Further, in the polymerization catalyst composition, the metallocene complex represented by the general formulae (i$_1$) and (ii$_1$) or the half-metallocene cation complex represented by the general formula (iii$_1$) may be combined with an appropriate co-catalyst suitable thereto so as to increase the cis-1,4-bond content and the molecular weight of the polymer to be obtained.

(Second Polymerization Catalyst Composition)

Next, the second polymerization catalyst composition is described.

The second polymerization catalyst composition includes a polymerization catalyst composition that contains:

Component ($\alpha$1): a rare earth element compound, or a reaction product of a rare earth element compound and a Lewis base, which does not have a bond between rare earth element and carbon, Component ($\beta$1): at least one selected from the group consisting of an ionic compound ($\beta$1-1) of a non-coordinating anion and a cation, ($\beta$1-2) an aluminoxane, and ($\beta$1-3) at least one halogen compound among a Lewis acid, a complex compound of a metal halide and a Lewis base, and an active halogen-containing organic compound.

In the case where the second polymerization catalyst composition contains at least one selected from the group consisting of an ionic compound ($\beta$1-1) and a halogen compound ($\beta$1-3), the polymerization catalyst composition further contains:

Component ($\gamma$1): an organic metal compound represented by the following formula (i$_2$):

$$YR^1_aR^2_bR^3_c \qquad (i_2)$$

wherein Y represents a metal selected from Group 1, Group 2, Group 12 and Group 13 of the Periodic Table, $R^1$ and $R^2$ each independently represent a hydrocarbon group having 1 to 10 carbon atoms, or a hydrogen atom, $R^3$ represents a hydrocarbon group having 1 to 10 carbon atoms, $R^1$, $R^2$ and $R^3$ may be the same as or different from each other, when Y is a metal selected from Group 1 of the Periodic Table, a is 1 and b and c are 0, when Y is a metal selected from Group 2 and Group 12 of the Periodic Table, a and b are 1 and c is 0, when Y is a metal selected from Group 13 of the Periodic Table, a, b and c are 1.

The ionic compound ($\beta$1-1) and the halogen compound ($\beta$1-3) do not have a carbon atom to be supplied to the component ($\alpha$1), and therefore the composition of the case needs the component ($\gamma$1) as a carbon source to the component ($\alpha$1). Even when the polymerization catalyst composition contains the aluminoxane ($\beta$1-2), the polymerization catalyst composition may contain the component ($\gamma$1). In addition, the second polymerization catalyst composition may contain any other component that may be contained in ordinary rare earth element compound-containing polymerization catalyst compositions, for example, a co-catalyst.

Preferably, in a polymerization reaction system, the concentration of the component ($\alpha$1) contained in the second polymerization catalyst composition is within a range of 0.1 to 0.0001 mol/l.

The component ($\alpha$1) to be used in the second polymerization catalyst composition is a rare earth element compound, or a reaction product of a rare earth element compound and a Lewis base. Here, the rare earth element compound and the reaction product of a rare earth element compound and a Lewis base do not have a bond between rare earth element and carbon. In the case where the rare earth element compound and the reaction product do not have a rare earth element-carbon bond, the compound is stable and is easy to handle. Here, the rare earth element compound is a compound containing a rare earth element (M), that is, a lanthanoid element composed of elements of Atomic Numbers 57 to 71 in the Periodic Table, or scandium or yttrium.

Specific examples of the lanthanoid element include lanthanum, cerium, praseodymium, neodymium, promethium, samarium, europium, gadolinium, terbium, dysprosium, holmium, erbium, thulium, ytterbium, and lutetium. One alone or two or more kinds of the components ($\alpha$1) may be used either singly or as combined.

Preferably, the rare earth element compound is a salt or complex compound where the rare earth metal is divalent or trivalent, and is more preferably a rare earth element compound containing at least one ligands selected from a hydrogen atom, a halogen atom and an organic compound residue. Further, the rare earth element compound or the reaction product of the rare earth element compound and a Lewis base is preferably represented by the following formula (ii$_2$) or (iii$_2$):

$$M^{11}X^{11}_2 \cdot L^{11}_w \qquad (ii_2)$$

$$M^{11}X^{11}_3 \cdot L^{11}_w \qquad (iii_2)$$

wherein $M^{11}$ each independently represents a lanthanoid element, scandium or yttrium, $X^{11}$ each independently represents a hydrogen atom, a halogen atom, an alkoxy group, a thiolate group, an amino group, a silyl group, an aldehyde residue, a ketone residue, a carboxylic acid residue, a thiocarboxylic acid residue or a phosphorus compound residue, $L^{11}$ each independently represents a Lewis base, and w each independently represents 0 to 3, plural $X^{11}$'s and plural $L^{11}$'s each may be the same or different.

The group (ligand) that bonds to the rare earth element of the rare earth element compound includes a hydrogen atom, a halogen atom, an alkoxy group (a group resulting from removal of hydrogen from the hydroxy group of an alcohol, and this forms a metal alkoxide), a thiolate group (a group resulting from removal of hydrogen from the thiol group of a thiol compound, and this forms a metal thiolate), an amino group (a group resulting from removal of one hydrogen atom bonding to the nitrogen atom of an ammonia, a primary amine or a secondary amine, and this forms a metal amide), a silyl group, an aldehyde residue, a ketone residue, a carboxylic acid residue, a thiocarboxylic acid residue or a phosphorus compound residue.

More specifically, the group includes a hydrogen atom; a halogen atom such as a fluorine atom, a chlorine atom, a bromine atom and an iodine atom; an aliphatic alkoxy group such as a methoxy group, an ethoxy group, a propoxy group, and various butoxy groups such as an n-butoxy group, an isobutoxy group, a sec-butoxy group, a tert-butoxy group; an aromatic alkoxy group such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, a 2-isopropyl-6-neopentylphenoxy group; an aliphatic thiolate group such as a thiomethoxy group, a thioethoxy group, a thiopropoxy group, a thio-n-butoxy group, a thio-isobutoxy group, a thio-sec-butoxy group, a thio-tert-butoxy group; an arylthiolate group such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-neopentylthiophenoxy group, a 2-isopropyl-6-neopentylthiophenoxy group, a 2,4,6-triisopropylthiophenoxy group; an aliphatic amino group such as a dimethylamino group, a diethylamino group, a diisopropylamino group; an arylamino group such as a phenylamino group, a 2,6-di-tert-butylphenylamino group, a 2,6-diisopropylphenylamino group, a 2,6-dineopentylphenylamino group, a 2-tert-butyl-6-isopropylphenylamino group, a 2-tert-butyl-6-neopentylphenylamino group, a 2-isopropyl-6-neopentylphenylamino group, a 2,4,6-tert-butylphenylamino group; a bistrialkylsilylamino group such as a bistrimethylsilylamino group; and a silyl group such as a trimethylsilyl group, a tris(trimethylsilyl)silyl group, a bis(trimethylsilyl)methylsilyl group, a trimethylsilyl(dimethyl)silyl group, a triisopropylsilyl(bistrimethylsilyl)silyl group.

Further, the group (ligand) that bonds to the rare earth element of the rare earth element compound includes a residue of an aldehyde such as salicylaldehyde, 2-hydroxy-1-naphthaldehyde, 2-hydroxy-3-naphthaldehyde; a residue of a hydroxyphenone such as 2'-hydroxyacetophenone, 2'-hydroxybutyrophenone, 2'-hydroxypropiophenone; a residue of a diketone such as acetylacetone, benzoylacetone, propionylacetone, isobutylacetone, valerylacetone, ethylacetylacetone; a residue of a carboxylic acid such as isovaleric acid, caprylic acid, octanoic acid, lauric acid, myristic acid, palmitic acid, stearic acid, isostearic acid, oleic acid, linoleic acid, cyclopentanecarboxylic acid, naphthenic acid, ethylhexanoic acid, pivalic acid, Versatic acid [trade name by Shell Chemicals Japan Ltd., synthetic acid composed of a mixture of C10 monocarboxylic acid isomers], phenylacetic acid, benzoic acid, 2-naphthoic acid, maleic acid, succinic acid; a residue of a thiocarboxylic acid such as hexane thioacid, 2,2-dimethylbutane thioacid, decane thioacid, thiobenzoic acid; a residue of a phosphate ester such as dibutyl phosphate, dipentyl phosphate, dihexyl phosphate, diheptyl phosphate, dioctyl phosphate, bis(2-ethylhexyl) phosphate, bis(1-methylheptyl) phosphate, dilauroyl phosphate, dioleyl phosphate, diphenyl phosphate, bis(p-nonylphenyl) phosphate, bis(polyethylene glycol-p-nonylphenyl) phosphate, (butyl)(2-ethylhexyl) phosphate, (1-methylheptyl)(2-ethylhexyl) phosphate, (2-ethylhexyl)(p-nonylphenyl) phosphate; a residue of a phosphonate ester such as monobutyl 2-ethylhexylphosphonate, mono-2-ethylhexyl 2-ethylhexylphosphonate, mono-2-ethylhexyl phenylphosphonate, mono-p-nonylphenyl 2-ethylhexylphosphonate, mono-2-ethylhexyl phosphonate, mono-1-methylheptyl phosphonate, mono-p-nonylphenyl phosphonate; and a residue of a phosphinic acid such as dibutylphosphinic acid, bis(2-ethylhexyl)phosphinic acid, bis(1-methylheptyl)phosphinic acid, dilaurylphosphinic acid, dioleylphosphnic acid, diphenylphosphinic acid, bis(p-nonylphenyl)phosphinic acid, butyl(2-ethylhexyl)phosphinic acid, (2-ethylhexyl)(1-methylheptyl)phosphinic acid, (2-ethylhexyl)(p-nonylphenyl)phosphinic acid, butylphosphinic acid, 2-ethylhexylphosphinic acid, 1-methylheptylphoshinic acid, oleylphosphinic acid, laurylphosphinic acid, phenylphosphinic acid, p-nonylphenylphosphinic acid. One alone or plural kinds of these ligands may be used either singly or as combined.

More specifically, the rare earth element compound preferably contains a compound represented by the following formula (iv$_2$):

$$M\text{---}(NQ^1)(NQ^2)(NQ^3) \qquad (iv_2)$$

wherein M represents a lanthanoid element, scandium or yttrium, $NQ^1$, $NQ^2$ and $NQ^3$ each independently represent an amino group, and these may be the same or different, but have an M-N bond. Specifically, the compound represented by the general formula (iv$_2$) is characterized by having three M-N bonds. Having three M-N bonds, the compound has advantages in that the structure thereof is stable since each bond therein is chemically equivalent to each other, and therefore the compound is easy to handle.

In the above general formula (iv$_2$), the amino group represented by NQ ($NQ^1$, $NQ^2$ and $NQ^3$) includes an aliphatic amino group such as a dimethylamino group, a diethylamino group, a diisopropylamino group; an arylamino group such as a phenylamino group, a 2,6-di-tert-butylphenylamino group, a 2,6-diisopropylphenylamino group, a 2,6-dineopentylphenylamino group, a 2-tert-butyl-6-isopropylphenylamino group, a 2-tert-butyl-6-neopentylphenylamino group, a 2-isopropyl-6-neopentylphenylamino group, a 2,4,6-tert-butylphenylamino group; and a bistrialkylsilylamino group such as a bistrimethylsilylamino group, and above all, a bistrimethylsilylamino group is preferred.

In the component ($\alpha$1) to be used in the second polymerization catalyst composition, examples of the Lewis base to react with the above-mentioned rare earth element compound include tetrahydrofuran, diethyl ether, dimethylaniline, trimethyl phosphine, lithium chloride, neutral olefins, neutral diolefins. Here, in the case where the rare earth element compound reacts with plural Lewis bases (where w is 2 or 3 in the general formula (ii$_2$) and the general formula (iii$_2$)), the Lewis bases $L^{11}$'s may be the same or different.

The component (61) to be used in the second polymerization catalyst composition is at least one selected from the group consisting of an ionic compound (β1-1), an aluminoxane (β1-2) and a halogen compound (β1-3). The total content of the component (61) in the second polymerization catalyst composition is preferably 0.1 to 50 times by mol to the component (α1).

The ionic compound (β1-1) includes an ionic compound that is composed of a non-coordinating anion and a cation and reacts with a rare earth element compound or a reaction product thereof and a Lewis base of the component (α1) to form a cationic transition metal compound.

Examples of the non-coordinating anion include tetraphenyl borate, tetrakis(monofluorophenyl) borate, tetrakis(difluorophenyl) borate, tetrakis(trifluorophenyl) borate, tetrakis(tetrafluorophenyl) borate, tetrakis(pentafluorophenyl) borate, tetrakis(tetrafluoromethylphenyl) borate, tetra(tolyl) borate, tetra(xylyl) borate, (triphenyl, pentafluorophenyl) borate, [tri(pentafluorophenyl), phenyl] borate, tridecahydride-7,8-dicarbaundecaborate.

The cation includes a carbonium cation, an oxonium cation, an ammonium cation, a phosphonium cation, a cycloheptatrienyl cation, a transition metal-having ferrocenium cation.

Specific examples of the carbonium cation include a tri-substituted carbonium cation such as a triphenylcarbonium cation, a tri(substituted phenyl)carbonium cation. More specifically, the tri(substituted phenyl)carbonium cation includes a tri(methylphenyl)carbonium cation, a tri(dimethylphenyl)carbonium cation.

Specific examples of the ammonium cation include a trialkylammonium cation such as a trimethylammonium cation, a triethylammonium cation, a tripropylammonium cation, a tributylammonium cation (for example, a tri(n-butyl)ammonium cation); an N,N-dialkylanilinium cation such as an N,N-dimethylanilinium cation, an N,N-diethylanilinium cation, an N, N, 2, 4, 6-pentamethylanilinium cation; and a dialkylammonium cation such as a diisopropylammonium cation, a dicyclohexylammonium cation.

Specific examples of the phosphonium cation include a triarylphosphonium cation such as a triphenylphosphonium cation, a tri(methylphenyl)phosphonium cation, a tri(dimethylphenyl)phosphonium cation. Accordingly, as the ionic compound, a compound constructed by selecting the above-mentioned non-coordinating anion and the cation and combining them is preferred. Specifically, N,N-dimethylanilinium tetrakis(pentafluorophenyl)borate, and triphenylcarbonium tetrakis(pentafluorophenyl)borate are preferred.

One alone or two or more kinds of these ionic compounds may be used either singly or as combined. The content of the ionic compound (β1-1) in the second polymerization catalyst composition is preferably 0.1 to 10 times by mol, more preferably about 1 time by mol to the component (α1).

The above-mentioned aluminoxane (β1-2) is a compound obtained by bringing an organic aluminum compound into contact with a condensing agent, and examples thereof include a chain aluminoxane or a cyclic aluminoxane having a repeating unit represented by a formula: (—Al(R')O—) wherein R' represents a hydrocarbon group having 1 to 10 carbon atoms, a part of the hydrocarbon groups may be substituted with at least one selected from the group consisting of a halogen atom and an alkoxy group, and the degree of polymerization of the repeating unit is preferably 5 or more, more preferably 10 or more. Here, specific examples of R' include a linear or branched alkyl group such as a methyl group, an ethyl group, various propyl groups and various butyl groups, and among these, a methyl group is preferred.

Examples of the organic aluminum compound to be used as the starting material for the aluminoxane include a trialkylaluminum such as trimethylaluminum, triethylaluminum, tributylaluminum, triisobutylaluminum, and a mixture thereof. Trimethylaluminum is especially preferred. For example, an aluminoxane using a mixture of trimethylaluminum and tributylaluminum as the starting materials is preferably used.

The content of the aluminoxane (β1-2) in the second polymerization catalyst composition is preferably such that the elemental ratio of the aluminum element Al of the aluminoxane to the rare earth element M that constitutes the component (α1), Al/M could be 10 to 1,000 or so.

The halogen compound (β1-3) is at least one of a Lewis acid, a complex compound of a metal halide and a Lewis base, and an active halogen-containing organic compound, and, for example, the compound can react with a rare earth element compound or a reaction product thereof with a Lewis base, which is the component (α1), thereby generating an cationic transition metal compound, a halogenated transition metal compound, or a compound in which the transition metal center is short in charge. The total content of the halogen compound (β1-3) in the first polymerization catalyst composition is preferably 1 to 5 times by mol to the component (α1).

As the Lewis acid, a boron-containing halogen compound such as $B(C_6F_5)_3$ or the like, or an aluminum-containing halogen compound such as $Al(C_6F_5)_3$ or the like is usable, and in addition, a halogen compound containing an element belonging to Group 3, Group 4, Group 5, Group 6 or Group 8 of the Periodic Table is also usable. An aluminum halide or an organic metal halide is preferably used. The halogen element is preferably chlorine or bromine.

Specifically, the Lewis acid includes methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, tungsten hexachloride. Among these, diethylaluminum chloride, ethylaluminum sesquichloride, ethylaluminum dichloride, diethylaluminum bromide, ethylaluminum sesquibromide and ethylaluminum dibromide are especially preferred.

The metal halide that constitutes the complex compound of a metal halide and a Lewis base includes beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, gold bromide. Among these, magnesium chloride, calcium chloride, barium chloride, manganese chloride, zinc chloride, and copper chloride are preferred, and magnesium chloride, manganese chloride, zinc chloride and copper chloride are especially preferred.

As the Lewis base to constitute the complex compound of the metal halide and a Lewis base, a phosphorus compound, a carbonyl compound, a nitrogen compound, an ether compound and an alcohol are preferred. Specifically, the Lewis base includes tributyl phosphate, tri-2-ethylhexyl phosphate, triphenyl phosphate, tricresyl phosphate, triethyl phosphine, tributyl phosphine, triphenyl phosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, napthenic acid, Versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, lauryl alcohol. Among these, tri-2-ethylhexyl phosphate, tricresyl phosphate, acetylacetone, 2-ethylhexanoic acid, Versatic acid, 2-ethylhexyl alcohol, 1-decanol, and lauryl alcohol are preferred.

The Lewis base is reacted in a ratio of preferably 0.01 to 30 mol, more preferably 0.5 to 10 mol relative to 1 mol of the metal halide. Using the reaction product of the Lewis base reduces the metal to remain in the polymer.

The active halogen-containing organic compound includes benzyl chloride.

The component (γ1) for use in the second polymerization catalyst composition is an organic metal compound represented by the following formula (i₂):

wherein the description of Y, $R^1$, $R^2$ and $R^3$, and a, b and c is omitted as given hereinabove.

The component is preferably an organic aluminum compound represented by the following formula (v₂):

$$AlR^1R^2R^3 \quad (v_2)$$

wherein $R^1$ and $R^2$ each independently represent a hydrocarbon group having 1 to 10 carbon atoms, or a hydrogen atom, $R^3$ represents a hydrocarbon group having 1 to 10 carbon atoms, and $R^1$, $R^2$ and $R^3$ may be the same as or different from each other.

The organic aluminum compound represented by the general formula (v₂) includes trimethylaluminum, triethylaluminum, tri-n-propylaluminum, triisopropylaluminum, tri-n-butylaluminum, triisobutylaluminum, tri-tert-butylaluminum, tripentylaluminum, trihexylaluminum, tricyclohexylaluminum, trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride; ethylaluminum dihydride, n-propylaluminum dihydride, isobutylaluminum dihydride. Among these, triethylaluminum, triisobutylaluminum, diethylaluminum hydride, and diisobutylaluminum hydride are preferred. One alone or two or more kinds of the organic aluminum compounds as the component (γ1) mentioned above may be used either singly or as combined.

The content of the organic aluminum compound in the second polymerization catalyst composition is preferably 1 to 50 times by mol, more preferably about 10 times by mol to the component (α1).

(Third Polymerization Catalyst Composition)

Next, the third polymerization catalyst composition is described.

The third polymerization catalyst composition includes a polymerization catalyst composition that contains a metallocene composite catalyst represented by the following formula (i₃):

wherein R represents an unsubstituted or substituted indenyl group, this R coordinates with M, M represents a lanthanoid element, scandium or yttrium, X represents a hydrocarbon group having 1 to 20 carbon atoms, this X is in p-coordination with M and Q, Q represents an element of Group 13 of the Periodic Table, Y represents a hydrocarbon group having 1 to 20 carbon atoms, or a hydrogen atom, this Y coordinates with Q, and a and b are 2. Plural R's, X's and Y's each may be the same or different.

Preferred examples of the metallocene composite catalyst include a metallocene composite catalyst represented by the following formula (ii₃):

wherein $M^1$ represents a lanthanoid element, scandium or yttrium, $Cp^R$ represents an unsubstituted or substituted indenyl group, $R^A$ and $R^B$ each independently represent a hydrocarbon group having 1 to 20 carbon atoms, these $R^A$ and $R^B$ are in p-coordination with $M^1$ and Al, $R^C$ and $R^D$ each independently represent a hydrocarbon group having 1 to 20 carbon atoms, or a hydrogen atom, and plural $Cp^R$'s may be the same or different.

Using the above-mentioned metallocene composite catalyst, a polymer can be produced. As the metallocene composite catalyst, a catalyst that has been previously complexed with an aluminum catalyst may be used to reduce the amount of the alkylaluminum for use in polymerization of a synthetic isoprene, or to omit use of the alkylaluminum. When a conventional catalyst system is used, a large amount of an alkylaluminum must be used in synthetic isoprene polymerization. For example, in a conventional catalyst system, an alkylaluminum in an amount of 10 molar equivalents or more is needed relative to the metal catalyst therein, but an alkylaluminum in an amount of about 5 molar times may be enough for the metallocene composite catalyst to exhibit an excellent catalytic effect.

In the metallocene composite catalyst, the metals M and $M^1$ in the general formulae (i₃) and (ii₃) each are a lanthanoid element, scandium or yttrium. The lanthanoid element includes 15 elements of Atomic Numbers 57 to 71, and any of these may be the metal. Preferably, the metal M is samarium Sm, neodymium Nd, praseodymium Pr, gadolinium Gd, cerium Ce, holmium Ho, scandium Sc or yttrium Y.

In the general formula (i₃), R is an unsubstituted indenyl group or a substituted indenyl group, and this R coordinates with the metal M. Examples of the substituted indenyl group include a 1,2,3-trimethylindenyl group, a heptamethylindenyl group, a 1,2,4,5,6,7-hexamethylindenyl group.

In the general formula (i₃), Q is an element of Group 13 of the Periodic Table, and specifically includes boron, aluminum, gallium, indium, and thallium.

In the general formula (i₃), X is a hydrocarbon group having 1 to 20 carbon atoms, and this X is in p-coordination with M and Q. Here, "p-coordination" is meant to indicate a coordination mode that takes a crosslinking structure. The hydrocarbon group having 1 to 20 carbon atoms includes an alkyl group.

In the general formula (i₃), Y is a hydrocarbon group having 1 to 20 carbon atoms, or a hydrogen atom, and this Y coordinates with Q. Here, the hydrocarbon group having 1 to 20 carbon atoms includes an alkyl group.

In the general formula (ii₃), $Cp^R$ is an unsubstituted indenyl group or a substituted indenyl group. $Cp^R$ that has an indenyl ring as the basic skeleton may be represented by $C_9H_{7-x}R_X$ or $C_9H_{11-x}R_X$. Here, x is an integer of 0 to 7, or 0 to 11. Preferably, R is independently a hydrocarbon group or a metalloid group. The carbon number of the hydrocarbon group is preferably 1 to 20, more preferably 1 to 10, even more preferably 1 to 8. Specifically, preferred examples of the hydrocarbon group include an alkyl group such as a methyl group, an ethyl group; and an aryl group and an aralkyl group such as a phenyl group and a benzyl group. On the other hand, examples of metalloid of the metalloid group include germyl Ge, stannyl Sn and silyl Si. Preferably, the metalloid group has a hydrocarbon group, and the hydrocarbon group that the metalloid may have is the same as the above-mentioned hydrocarbon group. Specifically, the metalloid group includes a trimethylsilyl group.

Specifically, the substituted indenyl group includes a 2-phenylindenyl group, and a 2-methylindenyl group. Two $Cp^R$'s in the general formula (ii₃) may be the same as or different from each other.

In the general formula (ii₃), $R^A$ and $R^B$ are each independently a hydrocarbon group having 1 to 20 carbon atoms, and these $R^A$ and $R^B$ are in p-coordination with $M^1$ and Al. Here, "p-coordination" is meant to indicate a coordination mode that takes a crosslinking structure. The hydrocarbon group having 1 to 20 carbon atoms includes an alkyl group. In the general formula (ii₃), $R^C$ and $R^D$ each independently represent a hydrocarbon group having 1 to 20 carbon atoms, or a hydrogen atom, and examples of the hydrocarbon group having 1 to 20 carbon atoms include an alkyl group.

The metallocene composite catalyst can be obtained, for example, by reacting in a solvent a metallocene complex represented by the following general formula (iii3):

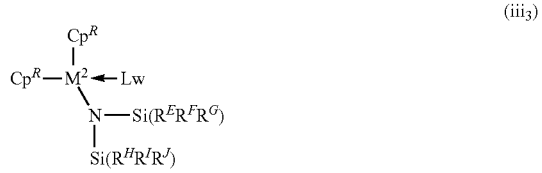

(iii₃)

wherein $M^2$ represents a lanthanoid element, scandium or yttrium, $Cp^R$ represents an unsubstituted or substituted indenyl group, $R^E$ to $R^J$ each independently represent an alkyl group having 1 to 3 carbon atoms, or a hydrogen atom, L represents a neutral Lewis base, w represents an integer of 0 to 3, and plural $Cp^R$'s may be the same or different, and an organic aluminum compound represented by $AlR^KR^LR^M$.

The reaction temperature may be room temperature or so, and therefore the catalyst can be produced under a mild condition. Not defined, the reaction time may be a few hours to tens of hours or so. The reaction solvent is not specifically limited, but is preferably a solvent capable of dissolving starting materials and products. For example, toluene or hexane may be used. The structure of the metallocene composite catalyst is preferably determined through ¹H-NMR or X-ray structural analysis.

In the metallocene complex represented by the general formula (iii₃), $Cp^R$ is an unsubstituted indenyl or substituted indenyl group, and has the same meaning as $Cp^R$ is in the general formula (ii₃). In the general formula (iii₃), the metal $M^2$ is a lanthanoid element, scandium or yttrium, and has the same meaning as $M^1$ in the general formula (ii₃).

The metallocene complex represented by the general formula (iii₃) contains a silylamide ligand [—N(SiR₃)₂]. The group R (groups $R^E$ to $R^J$) contained in the silylamide ligand each independently represent an alkyl group having 1 to 3 carbon atoms, or a hydrogen atom. Preferably, at least one of $R^E$ to $R^J$ is a hydrogen atom. When at least one of $R^E$ to $R^J$ is a hydrogen atom, the catalyst is easy to synthesis. The alkyl group is preferably a methyl group.

The metallocene complex represented by the general formula (iii₃) further contains 0 to 3, preferably 0 to 1 neutral Lewis base L. Here, examples of the neutral Lewis base L include tetrahydrofuran, diethyl ether, dimethylaniline, trimethyl phosphine, lithium chloride, neutral olefins, and neutral diolefins. Here, in the case where the complex contains plural neutral Lewis bases L's, the neutral Lewis bases L's may be the same or different.

The metallocene complex represented by the general formula (iii₃) may exist as a monomer, or may exist as a dimer or a more multimeric polymer.

In the organic aluminum compound which is used in producing the metallocene composite catalyst and is represented by $AlR^KR^LR^M$, $R^K$ and $R^L$ each independently represent a hydrocarbon group having 1 to 20 carbon atoms, or a hydrogen atom, $R^M$ represents a hydrocarbon group having 1 to 20 carbon atoms, and $R^M$, $R^K$ and $R^L$ may be the same or different. The hydrocarbon group having 1 to 20 carbon atoms for $R^M$, $R^K$ and $R^L$ includes an alkyl group.

The organic aluminum compound includes trimethylaluminum, triethylaluminum, tri-n-propylaluminum, triisopropylaluminum, tri-n-butylaluminum, triisobutylaluminum, tri-tert-butylaluminum, tripentylaluminum, trihexylaluminum, tricyclohexylaluminum, trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride; ethylaluminum dihydrides, n-propylaluminum dihydrides, and isobutylaluminum dihydrides. Among these, triethylaluminum, triisobutylaluminum, diethylaluminum hydride, and diisobutylaluminum hydride are preferred. One alone or plural kinds of these organic aluminum compounds may be used either singly or as combined.

The amount of the organic aluminum compound to be used for producing the metallocene composite catalyst is preferably 1 to 50 times by mol, more preferably about 10 times by mol to the metallocene complex.

The third polymerization catalyst composition may contain the above-mentioned metallocene composite catalyst and a boron anion, and preferably further contains any other component that may be contained in ordinary metallocene catalyst-containing polymerization catalyst compositions, for example, a co-catalyst. In this description, the metallocene composite catalyst and the boron anion, as combined, may be referred to as a two-component catalyst. In the case where the third polymerization catalyst composition contains the metallocene composite catalyst and a boron anion, the content of isoprene and any other monomer in the polymer to be polymerized can be readily controlled in any desired manner.

The boron anion to constitute the two-component catalyst in the third polymerization catalyst composition specifically includes a tetravalent boron anion. Examples of the boron anion include a tetraphenylborate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (triphenyl, pentafluorophenyl)borate, a [tris(pentafluorophenyl),phenyl]borate, and a tridecahydride-7,8-dicarbaundecaborate. Among these, a tetrakis(pentafluorophenyl)borate is preferred.

The boron anion may be used as an ionic compound, as combined with a cation. Examples of the cation that can be combined with the boron anion include a carbonium cation, an oxonium cation, an amine cation, a phosphonium cation, a cycloheptatrienyl cation, and a transition metal-having ferrocenium cation.

The carbonium cation includes a tri-substituted carbonium cation such as a triphenylcarbonium cation, and a tri(substituted phenyl)carbonium cation. Specifically, the tri(substituted phenyl)carbonyl cation includes a tri(methylphenyl)carbonium cation. The amine cation includes a trialkylammonium cation such as a trimethylammonium cation, a triethylammonium cation, a tripropylammonium cation, and a tributylammonium cation; an N,N-dialkylanilinium cation such as an N,N-dimethylanilinium cation, an N,N-diethylanilinium cation, and an N, N, 2, 4, 6-pentamethylanilinium cation; and a dialkylammonium cation such as a diisopropylammonium cation, and a dicyclohexylammonium cation. The phosphonium cation includes a triarylphosphonium cation such as a triphenylphosphonium cation, a tri(methylphenyl)phosphonium cation, and a tri(dimethylphenyl)phosphonium cation. Among these cations, an N,N-dialkylanilinium cation and a carbonium cation are preferred, and an N,N-dialkylanilinium cation is more preferred. Accordingly, the ionic compound is preferably N,N-dimethylanilinium tetrakis(pentafluorophenyl)borate, and triphenylcarbonium tetrakis(pentafluorophenyl)borate.

The ionic compound composed of a boron anion and a cation is added preferably in an amount of 0.1 to 10 times by mol, more preferably about 1 time by mol to the metallocene composite catalyst.

When a boron anion exists in the reaction system of reacting a metallocene complex represented by the above general formula (iii₃) and an organic aluminum compound, a metallocene composite catalyst of the above general formula (ii₃) could not be synthesized. Accordingly, in preparing the third polymerization catalyst composition, the metallocene composite catalyst is previously synthesized, and after the metallocene composite catalyst is isolated and purified, this must be combined with a boron anion.

Preferred examples of the co-catalyst usable in the third polymerization catalyst composition include the organic aluminum compound represented by $AlR^K R^L R^M$, as well as aluminoxanes. Examples of the aluminoxane include those of the aluminoxane described hereinabove to be usable as a co-catalyst in the first polymerization catalyst composition.

(Fourth Polymerization Catalyst Composition)

Next, the fourth polymerization catalyst composition is described. The fourth polymerization catalyst composition preferably contains a rare earth element compound and a compound having a cyclopentadiene skeleton. Specifically, the fourth polymerization catalyst composition preferably contains:

a rare earth element compound (hereinafter may be referred to as "component (α2)"), and at least one compound selected from the group consisting of a substituted or unsubstituted cyclopentadiene, a substituted or unsubstituted indene (indenyl group-having compound), and a substituted or unsubstituted fluorene (hereinafter may be referred to as "component (β2)").

The fourth polymerization catalyst composition may further contain: an organic metal compound (hereinafter may be referred to as "component (γ2)"), an aluminoxane compound (hereinafter may be referred to as "component (δ2)"), a halogen compound (hereinafter may be referred to as "component (ε2)").

Preferably, the fourth polymerization catalyst composition has high solubility for aliphatic hydrocarbons, and preferably forms a homogeneous solution in an aliphatic hydrocarbon. Examples of the aliphatic hydrocarbon include hexane, cyclohexane, and pentane.

Also preferably, the fourth polymerization catalyst composition does not contain an aromatic hydrocarbon. Here, examples of the aromatic hydrocarbon include benzene, toluene, and xylene.

Here, "not containing an aromatic hydrocarbon" means that the ratio of the aromatic hydrocarbon, if any, in the polymerization catalyst composition is less than 0.1% by mass.

The component (α2) may be a rare earth element-containing compound or a reaction product of a rare earth element-containing compound and a Lewis base, having a metal-nitrogen bond (M-N bond).

Here, examples of the rare earth element-containing compound include a compound containing scandium, yttrium or a lanthanoid element composed of elements of Atomic Numbers 57 to 71. Specifically, the lanthanoid element includes lanthanum, cerium, praseodymium, neodymium, promethium, samarium, europium, gadolinium, terbium, dysprosium, holmium, erbium, thulium, ytterbium, lutetium.

Examples of the Lewis base include tetrahydrofuran, diethyl ether, dimethylaniline, trimethyl phosphine, lithium chloride, neutral olefins, neutral diolefins.

Preferably, the rare earth element-containing compound or the reaction product of a rare earth element-containing compound and a Lewis base does not have a bond of rare earth element and carbon. In the case where the reaction product of a rare earth element-containing compound and a Lewis base does not have a rare earth element-carbon bond, the reaction product is stable and is easy to handle.

One alone or plural kinds of the above components (α2) may be used either singly or as combined.

The component (α2) is preferably a compound represented by a general formula (i₄):

$$M\text{-}(AQ^1)(AQ^2)(AQ^3) \qquad (i_4)$$

wherein M represents an element selected from the group consisting of scandium, yttrium and a lanthanoid element, $AQ^1$, $AQ^2$ and $AQ^3$ may be the same as or different from each other, each representing a functional group; A represents nitrogen, oxygen or sulfur, plural A's may be the same or different, and at least one A forms an M-A bond.

The compound can enhance the catalytic activity in the reaction system, can shorten the reaction time and can elevate the reaction temperature.

Specifically, the lanthanoid element includes lanthanum, cerium, praseodymium, neodymium, promethium, samarium, europium, gadolinium, terbium, dysprosium, holmium, erbium, thulium, ytterbium, and lutetium.

Especially from the viewpoint of enhancing catalytic activity and reaction control performance, M in the general formula (i$_4$) is preferably gadolinium.

In the case where A in the general formula (i$_4$) is nitrogen, the functional group represented by AQ$^1$, AQ$^2$ or AQ$^3$ (that is, NQ$^1$, NQ$^2$ or NQ$^3$) includes an amino group. In this case, the compound represented by the general formula (i$_4$) has three M-N bonds.

Examples of the amino group include an aliphatic amino group such as a dimethylamino group, a diethylamino group, a diisopropylamino group; an arylamino group such as a phenylamino group, a 2,6-di-tert-butylphenylamino group, a 2,6-diisopropylphenylamino group, a 2,6-dineopentylphenylamino group, a 2-tert-butyl-6-isopropylphenylamino group, a 2-tert-butyl-6-neopentylphenylamino group, a 2-isopropyl-6-neopentylphenylamino group, a 2,4,6-tert-butylphenylamino group; and a bistrialkylsilylamino group such as a bistrimethylsilylamino group. In particular, from the viewpoint of solubility for aliphatic hydrocarbons and aromatic hydrocarbons, a bistrimethylsilylamino group is preferred. In the general formula (i$_4$), the amino groups may be the same or different.

According to the above-mentioned constitution, the component (α2) can be a compound having three M-N bonds, in which each bond is chemically equivalent, and accordingly, the compound can have a stable structure and is easy to handle.

In addition, according to the constitution, the catalytic activity in the reaction system can be further enhanced. Consequently, the reaction time can be shortened more and the reaction temperature can be elevated more.

In the case where A is oxygen, examples of the component (α2) represented by the general formula (i$_4$) include, though not specifically limited thereto, a rare earth alcoholate represented by the following general formula (i$_{4a}$):

(R$^1$O)$_3$M    (i$_{4a}$), and a rare earth carboxylate represented by the following general formula (i$_{4b}$):

(R$^2$—CO$_2$)$_3$M    (i$_{4b}$).

In the general formulae (i$_{4a}$) and (i$_{4b}$), R$^1$ and R$^2$ each independently represent an alkyl group having 1 to 10 carbon atoms, and plural R$^1$'s and R$^2$'s each may be the same or different.

Preferably, the component (α2) does not have a bond of rare earth element and carbon, and therefore, the compound represented by the above-mentioned general formula (i$_{4a}$) or the general formula (i$_{4b}$) is favorably used. One alone or plural kinds of the component (α2) may be used either singly or as combined.

In the case where A is sulfur, examples of the component (α2) represented by the general formula (i$_4$) include, though not specifically limited thereto, a rare earth alkyl thiolate represented by the following general formula (i$_{4c}$):

(R$^3$S)$_3$M    (i$_{4c}$), and a compound represented by the following general formula (i$_{4d}$):

(R$^4$—CS$_2$)$_3$M    (i$_{4d}$).

In the general formulae (i$_{4c}$) and (i$_{4d}$), R$^3$ and R$^4$ each independently represent an alkyl group having 1 to 10 carbon atoms, and plural R$^3$'s and R$^4$'s each may be the same or different.

Preferably, the component (α2) does not have a bond of rare earth element and carbon, and therefore, the compound represented by the general formula (i$_{4c}$) or the general formula (i$_{4d}$) is favorably used.

The component (β2) is a compound selected from the group consisting of a substituted or unsubstituted cyclopentadiene, a substituted or unsubstituted indene (indenyl group-having compound) and a substituted or unsubstituted fluorene. One alone or plural kinds of the components for the component (β2) may be used either singly or as combined.

Here, the substituent in the substituted cyclopentadiene compound, the substituted indene compound, and the substituted fluorene compound includes a hydrocarbon group and a metalloid group, and the carbon number of the hydrocarbon group is preferably 1 to 20, more preferably 1 to 10, even more preferably 1 to 8. Specifically, preferred examples of the hydrocarbon group include an alkyl group such as a methyl group and an ethyl group; and an aryl group and an aralkyl group such as a phenyl group and a benzyl group. On the other hand, examples of metalloid of the metalloid group include germyl Ge, stannyl Sn, and silyl Si. Preferably, the metalloid group has a hydrocarbon group, and the hydrocarbon group that the metalloid group has is the same as the above-mentioned hydrocarbon group. Specifically, the metalloid group includes a trimethylsilyl group The cyclopentadiene compound and the substituted cyclopentadiene compound are a compound having a cyclopentadienyl group. Examples of the substituted cyclopentadiene compound include tetramethylcyclopentadiene, pentamethylcyclopentadiene, isopropylcyclopentadiene, trimethylsilyl-tetramethylcyclopentadiene, (1-benzyldimethylsilyl)cyclopenta[1]phenanthrene.

The indenyl compound and the substituted indenyl compound are a compound having an indenyl group. Examples of the substituted indene compound include 2-phenyl-1H-indene, 3-benzyl-1H-indene, 3-methyl-2-phenyl-1H-indene, 3-benzyl-2-phenyl-1H-indene, 1-benzyl-1H-indene, 1-methyl-3-dimethylbenzylsilyl-indene, 1,3-bis(tert-butyldimethylsilyl)-indene, (1-benzyldimethylsilyl-3-cyclopentyl)indene, and (1-benzyl-3-tert-butyldimethylsilyl)indene. Among these, 3-benzyl-1H-indene, 1-benzyl-1H-indene, 1,3-bis(tert-butyldimethylsilyl)-indene, (1-benzyldimethylsilyl-3-cyclopentyl)indene and (1-benzyl-3-tert-butyldimethylsilyl)indene are preferred.

The fluorene compound and the substituted fluorene compound are a compound having a fluorenyl group. The substituted fluorene compound includes trimethylsilylfluorene, isopropylfluorene, and 9-methyl-9H-fluorene.

Having the constitution as above, the component (β2) can increase the conjugated electrons that the cyclopentadiene skeleton-having compound can provide, and can therefore further enhance the catalytic activity in the reaction system. Consequently, the reaction time can be shortened further, and the reaction temperature can be elevated more.

The organic metal compound (component (γ2)) is a compound represented by a general formula (ii$_4$):

YR$^5_a$R$^6_b$R$^7_c$    (ii$_4$)

wherein Y represents an element selected from elements of Groups 1, Group 2, Group 12 and Group 13 of the Periodic Table, R$^5$ and R$^6$ each independently represent a hydrocarbon group having 1 to 10 carbon atoms, or a hydrogen atom, R$^7$ represents a hydrocarbon group having 1 to 10 carbon atoms, and $R^5$, $R^6$ and $R^7$ may be the same as or different from each other, when Y is a metal element of Group 1, a is 1 and b and c are 0, when Y is a metal element of Group 2 or Group 12, a and b are 1 and c is 0, and when Y is a metal element of Group 13, a, b and c are 1.

From the viewpoint of enhancing catalytic activity, preferably, at least one of $R^5$, $R^6$ and $R^7$ in the general formula (ii$_4$) differs from the others.

More specifically, the component (γ2) is preferably an organic aluminum compound represented by a general formula (iii$_4$):

$$AlR^8R^9R^{10} \qquad (iii_4)$$

wherein $R^8$ and $R^9$ each independently represent a hydrocarbon group having 1 to 10 carbon atoms, or a hydrogen atom, $R^{10}$ represents a hydrocarbon group having 1 to 10 carbon atoms, and $R^8$, $R^9$ and $R^{10}$ may be the same or different.

Examples of the organic aluminum compound include trimethylaluminum, triethylaluminum, tri-n-propylaluminum, triisopropylaluminum, tri-n-butylaluminum, triisobutylaluminum, tri-tert-butylaluminum, tripentylaluminum, trihexylaluminum, tricyclohexylaluminum, trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride; and ethylaluminum dihydride, n-propylaluminum dihydride, isobutylaluminum dihydride. Triethylaluminum, triisobutylaluminum, diethylaluminum hydride, and diisobutylaluminum hydride are especially preferred, and diisobutylaluminum hydride is especially more preferred. One alone or plural kinds of these organic aluminum compounds may be used either singly or as combined.

The aluminoxane compound (component (δ2)) is a compound obtained by bringing an organic aluminum compound into contact with a condensing agent. Using the component (δ2), the catalytic activity in the polymerization reaction system can be enhanced more. Consequently, the reaction time can be shortened more and the reaction temperature can be elevated more.

Examples of the organic aluminum compound include a trialkylaluminum such as trimethylaluminum, triethylaluminum, triisobutylaluminum, etc., and a mixture thereof, etc. In particular, trimethylaluminum and a mixture of trimethylaluminum and tributylaluminum are preferred.

Examples of the condensing agent include water.

Examples of the component (δ2) include an aluminoxane represented by a general formula (iv$_4$):

$$-(Al(R^{11})O)_n- \qquad (iv_4)$$

wherein $R^{11}$ represents a hydrocarbon group having 1 to 10 carbon atoms, and a part of the hydrocarbon group may be substituted with a halogen and/or an alkoxy group; $R^{11}$ may be the same or different in the repeating units; and n is 5 or more.

The molecular structure of the aluminoxane may be linear or cyclic.

Examples of the hydrocarbon group for $R^{11}$ include an alkyl group having 1 to 6 carbon atoms, preferably 1 to 4 carbon atoms, and a methyl group is especially preferred. Plural hydrocarbon groups for $R^{11}$'s may be the same or different. The hydrocarbon group for $R^{11}$ is especially preferably a combination of a methyl group and an isobutyl group.

n is preferably 10 or more.

The aluminoxane preferably has high solubility for aliphatic hydrocarbons such as hexane and cyclohexane and has low solubility for aromatic hydrocarbons. The aluminoxane of the type is available as a product of aluminoxane as a hexane solution thereof commercially available in the market.

In particular, the component (δ2) may be a modified aluminoxane (TMAO) represented by a general formula (v$_4$):

$$-(Al(CH_3)_x(i\text{-}C_4H_9)_yO)_m- \qquad (v_4)$$

wherein x+y is 1; m is 5 or more. The modified aluminoxane (TMAO) is available, for example, as "TMAO341" (product name by Tosoh Finechem Corporation).

The component (δ2) may also be a modified aluminoxane (MMAO) represented by a general formula (vi$_4$):

$$-(Al(CH_3)_{0.7}(i\text{-}C_4H_9)_{0.3}O)_k- \qquad (vi_4)$$

wherein k is 5 or more. The modified methylaluminoxane (MMAO) is available, for example, as MMAO-3A (product name by Tosoh Finechem Corporation).

Further, the component (δ2) may be especially a modified aluminoxane (PMAO) represented by a general formula (vii$_4$):

$$-[(CH_3)AlO]_i- \qquad (vii_4)$$

wherein i is 5 or more. The modified methylaluminoxane (PMAO) is available, for example, as TMAO211 (product name by Tosoh Finechem Corporation).

For the component (δ2), one alone or plural kinds of the above-mentioned compounds may be used either singly or as combined. The component (δ2) is preferably TMAO or MMAO among the above-mentioned modified aluminoxanes TMAO, MMAO and PMAO from the viewpoint of enhancing the effect of increasing the catalytic activity, and is more preferably TMAO from the viewpoint of further enhancing the effect of increasing the catalytic activity.

The halogen compound (component (ε2)) is at least one compound selected from a halogen-containing compound of a Lewis acid (hereinafter may be referred to as "component (ε2-1)"), a complex compound of a metal halide and a Lewis base (hereinafter may be referred to as "component (ε2-2)"), and an active halogen-containing organic compound (hereinafter may be referred to as "component (ε2-3)").

These compounds react with the component (δ2), that is, a rare earth element-containing compound or a reaction product of a rare earth element-containing compound and a Lewis base having an M-N bond to form a cationic transition metal compound, a halogenated transition metal compound and/or a transition metal compound where the transition metal center is short in electrons.

Using the component (ε2) may increase the cis-1,4-bond content in the synthetic isoprene in the rubber component (A).

Examples of the component (ε2-1) include a halogen-containing compound that contains an element of Group 3, Group 4, Group 5, Group 6, Group 8, Group 13, Group 14 or Group 15, etc., and in particular, an aluminum halide or an organic metal halide is preferred.

Examples of the halogen-containing compound of a Lewis acid include titanium tetrachloride, tungsten hexachloride, tri(pentafluorophenyl) borate, methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesqui-bromide, methylaluminum sesqui-chloride, ethylaluminum sesqui-bromide, ethylaluminum sesqui-chloride, aluminum tribromide, tri(pentafluorophenyl) aluminum, dibutyltin dichloride, tin tetrachloride, phosphorus trichloride, phosphorus pentachloride, antimony trichloride, and antimony pentachloride. In particular, aluminum halides such as ethylaluminum dichloride, ethylaluminum dibromide, diethylaluminum chloride, diethylaluminum bromide, ethylaluminum sesqui-chloride, and ethylaluminum sesqui-bromide are preferred.

The halogen is preferably chlorine or bromine.

One alone or plural kinds of the halogen-containing compounds of Lewis acids may be used either singly or as combined.

Examples of the metal halide to be used for the component (ε2-2) include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, and gold bromide. Magnesium chloride, calcium chloride, barium chloride, zinc chloride, manganese chloride and copper chloride are preferred, and magnesium chloride, zinc chloride, manganese chloride and copper chloride are further more preferred.

The Lewis base to be used for the component (ε2-2) is preferably a phosphorus compound, a carbonyl compound, a nitrogen compound, an ether compound and an alcohol.

Examples of the compounds include tributyl phosphate, tri-2-ethylhexyl phosphate, triphenyl phosphate, tricresyl phosphate, triethyl phosphine, tributyl phosphine, triphenyl phosphine diethylphosphinoethane, diphenylphosphinoethane, acetylacetone, benzoylacetone, propionylacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, Versatic acid, triethylamine, N,N-dimethylacetamide, tetrahydrofuran, diphenyl ether, 2-ethylhexyl alcohol, oleyl alcohol, stearyl alcohol, phenol, benzyl alcohol. 1-decanol, and lauryl alcohol. In particular, tri-2-ethylhexyl phosphate, tricresyl phosphate, acetylacetone, 2-ethylhexanoic acid, Versatic acid, 2-ethylhexyl alcohol, 1-decanol, and lauryl alcohol are preferred.

Regarding the molar number of the Lewis base, preferably, the base is reacted in a ratio of 0.01 to 30 mol, more preferably 0.5 to 10 mol relative to 1 mol of the metal halide. Using a reaction product with the Lewis base can reduce the metal to remain in the produced polymer.

Examples of the (ε2-3) component include benzyl chloride.

The ratio by mass of the components to constitute the fourth polymerization catalyst composition is described below.

The ratio by mol of the component (β2) (at least one compound selected from a substituted or unsubstituted cyclopentadiene, a substituted or unsubstituted indene and a substituted or unsubstituted fluorene) to the component (α2) (rare earth element compound) is more preferably 0.5 or more, and even more preferably 1 or more from the viewpoint of sufficiently attaining catalytic activity, preferably more than 0, and is preferably 3 or less, more preferably 2.5 or less, even more preferably 2.2 or less from the viewpoint of suppressing catalytic activity reduction.

The ratio by mol of the component (γ2) (organic metal compound) to the component (α2) is preferably 1 or more, more preferably 5 or more from the viewpoint of improving the catalytic activity in the reaction system, and is preferably 50 or less, more preferably 30 or less, and is specifically, even more preferably about 10 from the viewpoint of suppressing catalytic activity reduction in the reaction system.

The ratio by mol of aluminum in the component (δ2) (aluminoxane) to the rare earth element in the component (α2) is preferably 10 or more, more preferably 100 or more from the viewpoint of improving the catalytic activity in the reaction system, and is preferably 1,000 or less, more preferably 800 or less from the viewpoint of suppressing catalytic activity reduction in the reaction system.

The ratio by mol of the component (ε2) (halogen compound) to the component (α2) is preferably 0 or more, more preferably 0.5 or more, even more preferably 1.0 or more from the viewpoint of enhancing catalytic activity, and is preferably 20 or less, more preferably 10 or less from the viewpoint of maintaining the solubility of the component (ε2) and preventing the catalytic activity from lowering. Within the above range, the effect of increasing the cis-1,4-bond content in the conjugated diene copolymer can be enhanced.

Preferably, the fourth polymerization catalyst composition does not contain an ionic compound composed of a non-coordinating anion (for example, tetravalent boron anion, etc.) and a cation (for example, carbonium cation, oxonium cation, ammonium cation, phosphonium cation, cycloheptatrienyl cation, transition metal-having ferrocenium cation). Here, the ionic compound has high solubility for aromatic hydrocarbons and has low solubility for hydrocarbons. Consequently, the polymerization catalyst composition not containing such an ionic compound can produce a conjugated diene polymer while further reducing environmental load and production cost. "Not containing an ionic compound" means that the proportion of an ionic compound, if any, in the polymerization catalyst composition is less than 0.01% by mass.

In the present invention, in producing a synthetic isoprene through polymerization, from the viewpoint of producing a synthetic isoprene having a more increased weight-average molecular weight (Mw), the polymerization catalyst to be used is a more narrowed molecular weight distribution (Mw/Mn) and a higher cis-1,4 bond content, preferably any of the first to fourth polymerization catalyst compositions, and above all, use of the fourth polymerization catalyst composition is preferred.

(Coupling Step)

The production method for the synthetic isoprene may optionally contain a coupling step. The coupling step is a step of modifying (by coupling) at least a part (for example, the terminal) of the polymer chain of the synthetic isoprene obtained in the previous polymerization step.

The coupling reaction is preferably carried out when the polymerization reaction in the previous polymerization step has reached 100%.

The coupling agent to be used for the coupling reaction is not specifically limited, and may be appropriately selected depending on the intended purpose. Examples of the coupling agent include a tin-containing compound such as bis(maleic acid-1-octadecyl)dioctyltin(IV), etc.; an isocyanate compound such as 4,4'-diphenylmethane diisocyanate, etc.; and an alkoxysilane compound such as glycidylpropyltrimethoxysilane. Among these, bis(maleic acid-1-octadecyl)dioctyltin(IV) is preferred from the viewpoint of reaction efficiency and low gel formation. The coupling reaction increases the number-average molecular weight (Mn). One alone or plural kinds of these coupling agents may be used either singly or as combined.

The reaction temperature in the coupling reaction is not specifically limited, and may be appropriately controlled depending on the intended purpose. For example, the temperature is preferably 10 to 100° C., more preferably 20 to 80° C. When the reaction temperature is 10° C. or higher, the reaction speed increases, and when it is 100° C. or lower, gelation of the produced polymer can be suppressed more efficiently.

The reaction time in the coupling reaction is not specifically limited, and may be appropriately controlled depending on the intended purpose. From the viewpoint of more efficiently suppressing gelation of the produced polymer while sufficiently carrying out the coupling reaction, for example, the time may be 10 minutes to 1 hour or so.

(Washing Step)

The production method for the synthetic isoprene may optionally contain a washing step. The washing step is a step of washing the synthetic isoprene obtained in the previous polymerization step, and according to this step, the residual amount of the catalyst in remaining in the synthetic isoprene can be reduced.

The medium to be used for washing is not specifically limited and may be appropriately selected depending on the intended purpose. For example, methanol, ethanol, 2-propanol or the like solvent may be used, and in the case where a Lewis acid-derived catalyst is used as the polymerization catalyst, in particular, an acid (for example, hydrochloric acid, sulfuric acid, nitric acid) may be added to the solvent for use for washing. The amount of the acid to be added is preferably 15 mol % or less of the solvent. When the amount of the acid is 15 mol % or less, the residual amount of the acid to remain in the synthetic isoprene can be reduced, and therefore the reaction in kneading and vulcanization can be carried out more efficiently.

The synthetic isoprene produced according to the production method using at least one polymerization catalyst composition preferably selected from the above-mentioned first to fourth polymerization catalyst compositions has such properties of a high weight-average molecular weight (Mw) of 800,000 or more, a narrow molecular weight distribution (Mw/Mn) of 2.5 or less, and a cis-1,4 bond content of 96% or more.

<<Carbon Black (B)>>

The rubber composition for tires of the present invention contains a carbon black (B).

The carbon black is not specifically limited and may be appropriately selected depending on the intended purpose, and examples thereof include FEF, GPF, SRF, HAF, N339, IISAF, ISAF, and SAF. One alone or plural kinds of these may be used either singly or as combined.

The nitrogen adsorption specific surface area ($N_2SA$) of carbon black for use as the carbon black (B) is not specifically limited and may be appropriately selected depending on the intended purpose, and is preferably 20 to 150 m$^2$/g, more preferably 30 to 130 m$^2$/g, even more preferably 35 to 100 m$^2$/g. When $N_2SA$ of carbon black is 20 m$^2$/g or more, the resultant rubber composition may have improved crack resistance and tear resistance, and when it is 140 m$^2$/g or less, the dispersibility of the carbon black may increase. In this description, the nitrogen adsorption specific surface area ($N_2SA$) is a value measured according to JIS K6217-2:2001.

The dibutyl phthalate oil absorption amount (DBP oil absorption amount) of carbon black for use as the carbon black (B) is preferably 60 to 150 ml/100 g, more preferably 70 to 140 ml/100 g. When the DBP oil absorption amount is 60 ml/100 g or more, the crack resistance and the tear resistance of the resultant rubber composition may increase, and when it is 150 ml/100 g or less, the workability of the rubber composition may increase and the composition is easy to handle. In this description, the DBP oil absorption amount is a value measured according to JIS K6217-4:2001 (method for measurement of oil absorption amount).

The content of the carbon black (B) relative to 100 parts by mass of the rubber component (A) is preferably 20 parts by mass or more, more preferably 30 parts by mass or more, even more preferably 40 parts by mass or more, and the upper limit is preferably 100 parts by mass or less, more preferably 85 parts by mass or less, even more preferably 70 parts by mass or less. When the content of the carbon black (B) falls within the above range, the crack resistance and the tear resistance of the resultant rubber composition can efficiently improve, and the low heat generation property thereof also improves whereby the rolling resistance of tires can reduce and low fuel consumption can improve.

<<Carbon Black Dispersant (C)>>

The rubber composition for tires of the present invention contains a carbon black dispersant (C) of at least one selected from compounds represented by the following general formulae (1) to (6), and a salt, a solvate and a solvate of the salt of a compound represented by the following general formula (5):

(1)

(2)

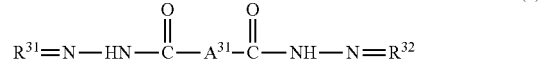

(3)

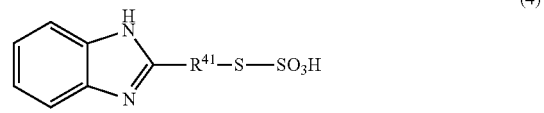

(4)

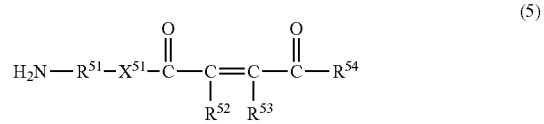

(5)

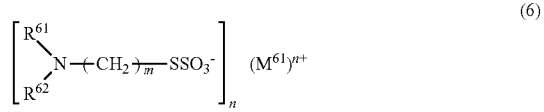

(6)

In the general formula (1), $A^{11}$ represents an aryl group, a hydantoin skeleton-having group or a linear hydrocarbon group with 1 to 18 carbon atoms, which may have at least one polar group; $R^{11}$ and $R^{12}$ each independently represent a hydrogen atom, an acyl group, an amide group, an alkyl group, a cycloalkyl group or an aryl group.

In the general formula (2), $A^{21}$ represents an aryl group, a hydantoin skeleton-having group or a linear hydrocarbon group with 1 to 18 carbon atoms, which may have at least one polar group; $R^{21}$ represents an alkanediyl group, a cycloalkanediyl group or an arenediyl group.

In the general formula (3), $A^{31}$ represents an arenediyl group, a hydantoin skeleton-having group or a linear hydrocarbon group with 1 to 18 carbon atoms, which may have at least one polar group; $R^{31}$ and $R^{32}$ each independently represent an alkanediyl group, a cycloalkanediyl group or an arenediyl group.

In the general formula (4), $R^{41}$ represents an alkanediyl group with 1 to 6 carbon atoms.

In the general formula (5), $R^{51}$ represents an alkanediyl group with 1 to 12 carbon atoms, a cycloalkanediyl group with 3 to 12 carbon atoms, or $-B^{51}-A^{51}-B^{52}-$; $A^{51}$ represents an arenediyl group with 6 to 12 carbon atoms; $B^{51}$ and $B^{52}$ each independently represent a single bond or an alkanediyl group with 1 to 12 carbon atoms; $R^{52}$ and $R^{53}$ each independently represent a hydrogen atom, a halogen atom, an alkyl group with 1 to 6 carbon atoms, an aryl group with 6 to 12 carbon atoms, a hydroxy group, or an alkoxy group with 1 to 6 carbon atoms, or bonding to each other to form a cyclic structure; $R^{54}$ represents a hydroxy group, an alkoxy group with 1 to 6 carbon atoms, an aryloxy group with 6 to 12 carbon atoms, an arylalkoxy group with 7 to 15 carbon atoms, $-NR^{55}R^{56}$ or $-O-((Y^{51})^{n+})^{1/n}$; $R^{55}$ and $R^{56}$ each independently represent a hydrogen atom, an alkyl group with 1 to 6 carbon atoms, or an aryl group with 6 to 12 carbon atoms; $(Y^{51})^{n+}$ represents an n-valent cation capable of forming a carboxylate salt; and $X^{51}$ represents $-NH-$ or $-O-$.

In the general formula (6), $R^{61}$ and $R^{62}$ each independently represent a hydrogen atom or an alkyl group with 1 to 6 carbon atoms, or bonding to each other to form a cyclic structure; $(M^{61})^{n+}$ represents $H^+$ or an n-valent metal ion; m represents an integer of 2 to 9; n represents an integer of 1 or 2.

(Compound Represented by General Formula (1))

The carbon black dispersant (C) includes a compound represented by the following general formula (1) (hereinafter may be referred to as "compound 1").

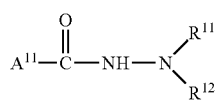

(1)

In the general formula (1), $A^{11}$ represents an aryl group, a hydantoin skeleton-having group or a linear hydrocarbon group with 1 to 18 carbon atoms, which may have at least one polar group; $R^{11}$ and $R^{12}$ each independently represent a hydrogen atom, an acyl group, an amide group, an alkyl group, a cycloalkyl group or an aryl group.

The compound 1 has an aryl group, a hydantoin skeleton-having group or a linear hydrocarbon group with 1 to 18 carbon atoms as $A^{11}$, and therefore attains a high affinity with the carbon black (B) and, in addition, in this, since the hydrazide skeleton-having moiety has a high affinity for the rubber component (A), the chemical interaction between the rubber component (A) and the carbon black (B) can be thereby greatly enhanced. Accordingly, hysteresis caused by rubbing of particles of carbon black (B) against each other can be reduced to improve low heat generation property and, as a result, rolling resistance of tires reduces and low fuel consumption improves. In addition, since the dispersibility of carbon black improves, the crack resistance and the tear resistance of the resultant rubber composition can also improve.

Further, as a result of great increase in the chemical interaction between the rubber component (A) and the carbon black (B), the scorching resistance of the rubber composition of the present invention can improve (to prolong scorching time) while maintaining the low heat generation property thereof, and therefore the workability of the rubber composition can be thereby enhanced.

The aryl group for $A^{11}$ includes an aromatic hydrocarbon group such as a phenyl group, a 4-methylphenyl group, a naphthyl group, an anthryl group, a phenanthryl group, and a triphenylenyl group. Above all, a phenyl group and a naphthyl group are preferred, and a phenyl group is more preferred.

The linear hydrocarbon group having 1 to 18 carbon atoms includes a saturated or unsaturated linear hydrocarbon group such as a linear alkyl group and a linear alkenyl group, and above all, a linear alkyl group is preferred. In this case, the saturated or unsaturated linear hydrocarbon group is preferably a linear alkyl group having 1 to 12 carbon atoms, more preferably a linear alkyl group having 2 to 8 carbon atoms.

In the present invention, from the viewpoint of improving low fuel consumption by improving the high affinity and the low heat generation property of the rubber composition, $A^{11}$ is preferably an aryl group.

$A^{11}$ may have at least one polar group, and from the viewpoint of improving the affinity for the carbon black (B), the number of the polar groups is preferably 2 or more.

Examples of the polar group that $A^{11}$ has include an amino group, an imino group, a nitrile group, an ammonium group, an imide group, an amide group, a hydrazo group, an azo group, a diazo group, a hydroxy group, a carboxy group, a carbonyl group, an epoxy group, an oxycarbonyl group, a nitrogen-containing heterocyclic group, an oxygen-containing heterocyclic group, a tin-containing group, an alkoxysilyl group, an alkylamino group, and a nitro group. Two or more polar groups, if any, may be the same or different.

From the viewpoint of attaining a higher affinity along with improving the low fuel consumption by improving the low heat generation property of the rubber composition, regarding the polar group that $A^{11}$ has at least one polar group is preferably an amino group, a hydroxy group or a nitro group, more preferably a hydroxy group, and especially more preferably, at least two polar groups are hydroxy groups.

$R^{11}$ and $R^{12}$ each independently represent a hydrogen atom, an acyl group, an amide group, an alkyl group, a cycloalkyl group or an aryl group, and they may be the same or different. $R^{11}$ and $R^{12}$ may contain at least one atom selected from an oxygen atom, a sulfur atom and a nitrogen atom. In this case, $R^{11}$ and $R^{12}$ include a group containing any such atom, or a group substituted with any such atom or with a substituent containing any such atom.

From the viewpoint of attaining a higher affinity and improving the low fuel consumption by improving the low heat generation property of the rubber composition, $R^{11}$ and $R^{12}$ each are preferably a hydrogen atom or an alkyl group, more preferably a hydrogen atom or an alkyl group having 1 to 12 carbon atoms, even more preferably a hydrogen atom, and especially preferably, both $R^{11}$ and $R^{12}$ are hydrogen atoms.

Preferred examples of the compound 1 include 3-hydroxy-naphthoic acid hydrazide, 2,3-dihydroxybenzohydrazide, 2,4-dihydroxybenzohydrazide, 2,5-dihydroxybenzohydrazide, 2,6-dihydroxybenzohydrazide, and 3,5-dihydroxybenzohydrazide.

The molecular weight of the compound 1 is preferably 200 or less, more preferably 180 or less. When the molecular weight falls within the above range, the affinity for the rubber component (A) improves, and the low fuel consumption is improved by improvement of the low heat generation property of the rubber composition.

The melting point of the compound 1 is preferably 80° C. or higher and lower than 250° C., more preferably 200° C. or lower. When the compound 1 has such a lower melting point that falls within the above range, the affinity for the rubber component (A) improves, and the low fuel consumption is improved by improvement of the low heat generation property of the rubber composition. In the present invention, one alone or plural kinds of the compound 1 can be used either singly or as combined.

(Compound Represented by General Formula (2))

The carbon black dispersant (C) includes a compound represented by the following general formula (2) (hereinafter may be referred to as "compound 2").

(2)

In the general formula (2), $A^{21}$ represents an aryl group, a hydantoin skeleton-having group or a linear hydrocarbon group with 1 to 18 carbon atoms, which may have at least one polar group; $R^{21}$ represents an alkanediyl group, a cycloalkanediyl group or an arenediyl group.

The compound 2 has an aryl group, a hydantoin skeleton-having group or a linear hydrocarbon group with 1 to 18 carbon atoms as $A^{21}$, and therefore attains a high affinity with the carbon black (B) and, in addition, in this, since the hydrazide skeleton-having moiety has a high affinity for the rubber component (A), the chemical interaction between the rubber component (A) and the carbon black (B) can be thereby greatly enhanced. Accordingly, hysteresis caused by rubbing of particles of carbon black (B) against each other can be reduced to improve low heat generation property and, as a result, rolling resistance of tires reduces and low fuel consumption improves. In addition, since the dispersibility of carbon black improves, the crack resistance and the tear resistance of the resultant rubber composition can also improve.

Further, as a result of great increase in the chemical interaction between the rubber component (A) and the carbon black (B), the scorching resistance of the rubber composition of the present invention can improve (to prolong scorching time) while maintaining the low heat generation property thereof, and therefore the workability of the rubber composition can be thereby enhanced.

The aryl group, the hydantoin skeleton-having group and the linear hydrocarbon group having 1 to 18 carbon atoms for $A^{21}$ are the same as those described hereinabove for $A^{11}$. In the present invention, from the viewpoint of securing a higher affinity and improving the low fuel consumption by improving the low heat generation property of the rubber composition, $A^{21}$ is preferably an aryl group.

The aryl group for $A^{21}$ is preferably a group having 2 or more aromatic rings, more preferably a group having 3 or more aromatic rings. When the aryl group has 2 or more aromatic rings, the affinity for the carbon black (B) improves and therefore the low heat generation property of the rubber composition improves and the low fuel consumption thereof also improves.

$A^{21}$ may have at least one polar group, and may have 2 or more polar groups. Preferred examples of the polar group are the same as those exemplified hereinabove for the polar group that $A^{11}$ may have, and from the viewpoint of securing a higher affinity and improving the low fuel consumption by improving the low heat generation property of the rubber composition, preferably, at least one polar group is an amino group, a hydroxy group or a nitro group, more preferably an amino group or a hydroxy group, even more preferably a hydroxy group.

$R^{21}$ represents an alkanediyl group, a cycloalkanediyl group or an arenediyl group. The alkanediyl group preferably has 1 to 12 carbon atoms, more preferably 2 to 10 carbon atoms, even more preferably 3 to 8 carbon atoms, and the cycloalkanediyl group preferably has 3 to 12 carbon atoms.

The alkanediyl group includes a methylene group, an ethylene group, various propylene groups, various butylene groups, various pentylene groups, various hexylene groups, various heptylene groups, various octylene groups, various nonylene groups, various decylene groups, various undecylene groups, and various dodecylene groups; the cycloalkanediyl group includes various cyclopropylene groups, various cyclobutylene groups, various cyclopentylene groups, various cyclohexylene groups, various cycloheptylene groups, various cyclooctylene groups, various cyclononylene groups, various cyclodecylene groups, various cycloundecylene groups, and various cyclododecylene groups.

The arenediyl group includes various phenylene groups, various naphthylene groups, various biphenylene groups, and those derived from the exemplifications of the aryl group for $A^{11}$ mentioned hereinabove by removal of one hydrogen atom. $R^{21}$ may contain at least one atom selected from an oxygen atom, a sulfur atom and a nitrogen atom. In this case, $R^{21}$ includes a group containing any such atom, or a group substituted with any such atom or with a substituent containing any such atom.

From the viewpoint of attaining a higher affinity and improving the low fuel consumption by improving the low heat generation property of the rubber composition, $R^{21}$ is preferably an alkanediyl group, above all, preferably a branched alkanediyl group.

Preferred examples of the compound 2 include compounds having one aromatic ring such as N'-(1-methylethylidene)salicylic acid hydrazide, N'-(1-methylpropylidene) salicylic acid hydrazide, N'-(1,3-dimethylbutylidene) salicylic acid hydrazide, N'-(2-furylmethylene)salicylic acid hydrazide, 2,3-dihydroxy-N'-(4-methylpentan-2-ylidene) benzohydrazide, 2,4-dihydroxy-N'-(4-methylpentan-2-ylidene)benzohydrazide, 2,5-dihydroxy-N'-(4-methylpentan-2-ylidene)benzohydrazide, and 2,6-dihydroxy-N'-(4-methylpentan-2-ylidene)benzohydrazide; and compounds having two aromatic rings such as 1-hydroxy-N'-(1-methylethylidene)-2-naphthoic acid hydrazide, 1-hydroxy-N'-(1-methylpropylidene)-2-naphthoic acid hydrazide, 1-hydroxy-N'-(1,3-dimethylbutylidene)-2-naphthoic acid hydrazide, 1-hydroxy-N'-(2-furylmethylene)-2-naphthoic acid hydrazide, 3-hydroxy-N'-(1-methylethylidene)-2-naphthoic acid hydrazide, 3-hydroxy-N'-(1-methylpropylidene)-2-naphthoic acid hydrazide, 3-hydroxy-N'-(1,3-dimethylbutylidene)-2-naphthoic acid hydrazide, and 3-hydroxy-N'-(2-furylmethylidene)-2-naphthoic acid hydrazide. In the present invention, one alone or plural kinds of the compounds 2 may be used either singly or as combined.

(Compound Represented by General Formula (3))

The carbon black dispersant (C) includes a compound represented by the following general formula (3) (hereinafter may be referred to as "compound 3").

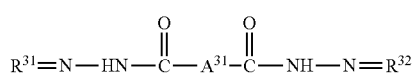

(3)

In the general formula (3), $A^{31}$ represents an arenediyl group, a hydantoin skeleton-having group or a linear hydrocarbon group with 1 to 18 carbon atoms, which may have at least one polar group; $R^{31}$ and $R^{32}$ each independently represent an alkanediyl group, a cycloalkanediyl group or an arenediyl group.

The compound 3 has an arenediyl group, a hydantoin skeleton-having group or a linear hydrocarbon group with 1 to 18 carbon atoms as $A^{31}$, and therefore attains a high affinity with the carbon black (B) and, in addition, in this, since the hydrazide skeleton-having moiety has a high affinity for the rubber component (A), the chemical interaction between the rubber component (A) and the carbon black (B) can be thereby greatly enhanced. Accordingly, hysteresis caused by rubbing of particles of carbon black (B) against each other can be reduced to improve low heat generation property and, as a result, rolling resistance of tires reduces and low fuel consumption improves. In addition, since the dispersibility of carbon black improves, the crack resistance and the tear resistance of the resultant rubber composition can also improve.

Further, as a result of great increase in the chemical interaction between the rubber component (A) and the carbon black (B), the scorching resistance of the rubber composition of the present invention can improve (to prolong scorching time) while maintaining the low heat generation property thereof, and therefore the workability of the rubber composition can be thereby enhanced.

The arenediyl group, the hydantoin skeleton-having group or the linear hydrocarbon group with 1 to 18 carbon atoms for $A^{31}$ includes those derived from the groups of $A^{11}$ mentioned hereinabove by removal of one hydrogen atom, that is, an arenediyl group, a hydantoin skeleton-having divalent group or a divalent linear hydrocarbon group having 1 to 18 carbon atoms such as a linear alkanediyl group.

In the present invention, from the viewpoint of securing a higher affinity and improving the low fuel consumption by improving the low heat generation property of the rubber composition, $A^{31}$ is preferably an arenediyl group.

The arenediyl group for $A^{31}$ is preferably a group having 2 or more aromatic rings, more preferably a group having 3 or more aromatic rings. When the group has 2 or more aromatic rings, the affinity for the carbon black (B) improves, and therefore the low heat generation property of the rubber composition improves and also the low fuel consumption thereof improves.

$A^{31}$ may have at least one polar group. The polar group includes those exemplified hereinabove as the polar group that $A^{11}$ may have. When $A^{31}$ has a polar group, from the viewpoint of securing a higher affinity and improving the low fuel consumption by improving the low heat generation property of the rubber composition, at least one polar group is preferably an amino group, a hydroxy group or a nitro group, more preferably an amino group or a hydroxy group, even more preferably a hydroxy group.

$R^{31}$ and $R^{32}$ are the same as those mentioned hereinabove for $R^{21}$. From the viewpoint of securing a higher affinity and improving the low fuel consumption by improving the low heat generation property of the rubber composition, $R^{31}$ and $R^{32}$ each are preferably an alkanediyl group, and above all, more preferably a branched alkanediyl group. $R^{31}$ and $R^{32}$ may be the same or different.

Preferred examples of the compound 3 include N,N'-di(1-methylethylidene) isophthalic acid dihydrazide, N,N'-di(1-methylpropylidene)isophthalic acid dihydrazide, and N,N'-di(1,3-dimethylbutylidene)isophthalic acid dihydrazide. In the present invention, one alone or plural kinds of the compounds 3 may be used either singly or as combined.

(Compound Represented by General Formula (4))

The carbon black dispersant (C) includes a compound represented by the following general formula (4) (hereinafter may be referred to as "compound 4").

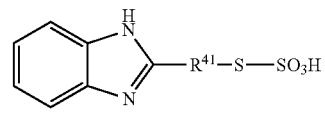

(4)

In the general formula (4), $R^{41}$ represents an alkanediyl group with 1 to 6 carbon atoms.

Examples of the benzimidazolylalkylthiosulfuric acid of the compound 4 include S-((benzimidazolyl-2)methyl)thiosulfuric acid, S-(2-(benzimidazolyl-2)ethyl)thiosulfuric acid, S-(3-(benzimidazolyl-2)-n-propyl)thiosulfuric acid, S-(2-(benzimidazolyl-2)isopropyl)thiosulfuric acid, S-(4-(benzimidazolyl-2)-n-butyl)thiosulfuric acid, S-(5-(benzimidazolyl-2)-n-pentyl)thiosulfuric acid, and S-(6-(benzimidazolyl-2)-n-hexyl)thiosulfuric acid. In the present invention, one alone or plural kinds of the compounds 4 may be used either singly or as combined.

The compound 4 can be synthesized in a known method, and for example, the compound can be synthesized by reacting a thiosulfate metal salt of an alkylcarboxylic acid (hereinafter may be referred to as "precursor") and an o-phenylenediamine in the presence of hydrochloric acid in water.

The reaction temperature between the precursor and an o-phenylenediamine is preferably 80 to 120° C., and the reaction time is appropriately determined depending on the setup reaction temperature and is preferably within a range of 2 to 24 hours.

The hydrochloride produced in the reaction is neutralized with an aqueous sodium hydroxide solution to give the compound 4 (benzimidazolylalkylthiosulfuric acid). After neutralized, the compound 4 can be isolated and purified by concentrating and evaporating the reaction liquid to dryness followed by extracting the resultant solid with a suitable solvent. The solvent for use for the extraction includes an alcohol such as methanol, ethanol, and 2-propanol.

The precursor can be produced by reacting a haloalkylcarboxylic acid and a metal thiosulfate in a suitable solvent such as water.

The reaction time and the reaction temperature for synthesizing the precursor are not specifically limited, the reaction temperature is preferably 0 to 90° C., more preferably 40 to 80° C., and the reaction time is preferably 1 to 12 hours, more preferably 2 to 8 hours.

The solvent for the reaction includes water, methanol, ethanol, 2-propanol, acetonitrile, dimethoxyethane, tetrahydrofuran, and dioxane. One alone or plural kinds of these solvents may be used either singly or as combined.

Examples of the haloalkylcarboxylic acid include monochloroacetic acid, 2-chloropropionic acid, 3-chloropropionic acid, 3-chlorobutanoic acid, 4-chlorobutanoic acid, 5-chloropentanoic acid, 6-chlorohexanoic acid, monobromoacetic acid, and 3-bromopropionic acid.

Examples of the metal thiosulfate include lithium thiosulfate, sodium thiosulfate, potassium thiosulfate, magnesium thiosulfate, cesium thiosulfate, cobalt thiosulfate, copper thiosulfate and zinc thiosulfate.

(Compound Represented by General Formula (5))

The carbon black dispersant (C) includes a compound represented by the following general formula (5) (hereinafter may be referred to as "compound 5"), a salt, a solvate and a solvate of the salt of the compound 5.

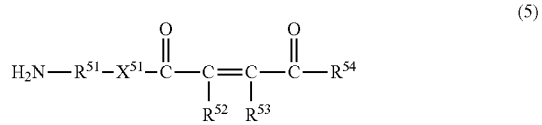
(5)

In the general formula (5), $R^{51}$ represents an alkanediyl group with 1 to 12 carbon atoms, a cycloalkanediyl group with 3 to 12 carbon atoms, or $—B^{51}-A^{51}-B^{52}—$; $A^{51}$ represents an arenediyl group with 6 to 12 carbon atoms; $B^{51}$ and $B^{52}$ each independently represent a single bond or an alkanediyl group with 1 to 12 carbon atoms; $R^{52}$ and $R^{53}$ each independently represent a hydrogen atom, a halogen atom, an alkyl group with 1 to 6 carbon atoms, an aryl group with 6 to 12 carbon atoms, a hydroxy group, or an alkoxy group with 1 to 6 carbon atoms, or bonding to each other to form a cyclic structure; $R^{54}$ represents a hydroxy group, an alkoxy group with 1 to 6 carbon atoms, an aryloxy group with 6 to 12 carbon atoms, an arylalkoxy group with 7 to 15 carbon atoms, $—NR^{55}R^{56}$ or $—O—((Y^{51})^{n+})^{1/n}$; $R^{55}$ and $R^{56}$ each independently represent a hydrogen atom, an alkyl group with 1 to 6 carbon atoms, or an aryl group with 6 to 12 carbon atoms; $(Y^{51})^{n+}$ represents an n-valent cation capable of forming a carboxylate salt; and $X^{51}$ represents $—NH—$ or $—O—$.

A salt of the compound 5 includes a carboxylate salt of the compound 5 where $R^{54}$ is a hydroxy group, and an addition salt to form with an acid in the amine moiety ($—NH_2$ or $—NH—$) in the compound 5. Here, examples of the carboxylate salt of the compound 5 include a salt of the compound represented by the general formula (5) or a salt thereof where $R^{54}$ is $—O—((Y^{51})^{n+})^{1/n}$. The acid to form the addition salt in the amine moiety in the compound 5 includes an inorganic acid and an organic acid.

A solvate of the compound 5 includes a methanolate and a hydrate.

Regarding the carbon-carbon double bond and the bond between $R^{53}$ and $—C(=O)—R^{54}$ in the compound 5, the compound may be any of a compound where the steric structure of the carbon-carbon double bond is an E-form, or a Z-form, or a mixture of an E-form compound and a Z-form compound. Above all, a compound where the steric structure of the carbon-carbon double bond is a Z-form is preferred.

The compound 5 is preferably a compound represented by the following general formula (5-1).

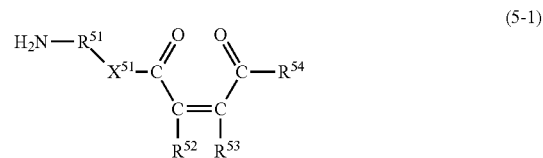
(5-1)

In the general formula (5-1), $R^{51}$, $R^{52}$, $R^{53}$, $R^{54}$ and $X^{51}$ are the same as $R^{51}$, $R^{52}$, $R^{53}$, $R^{54}$ and $X^{51}$, respectively in the above-mentioned general formula (5).

The carbon number of the alkanediyl group of $R^{51}$ is preferably 3 to 12, more preferably 3 to 6, and a linear alkanediyl group is preferred.

The alkanediyl group of $R^{51}$ may have a substituent, and examples of the substituent include an alkoxy group having 1 to 4 carbon atoms such as a methoxy group, an ethoxy group, various propoxy groups and various butoxy groups; a halogen atom such as chlorine, bromine, iodine, and fluorine; an aryl group having 6 to 12 carbon atoms such as a phenyl group, a 4-methylphenyl group, a naphthyl group, and a biphenyl group; and a hydroxy group. Examples of the alkanediyl group having a substituent include groups of the following formulae.

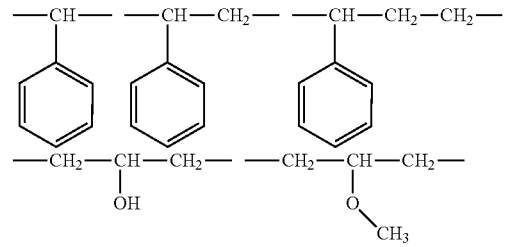

The cycloalkanediyl group of $R^{51}$ includes those exemplified hereinabove for the cycloalkanediyl group of $R^{21}$. The carbon number of the cycloalkanediyl group is preferably 3 to 12, more preferably 3 to 6. The cycloalkanediyl group of $R^{51}$ may have a substituent, and examples of the substituent include an alkyl group having 1 to 4 carbon atoms such as a methyl group, an ethyl group, various propyl groups and various butyl groups; an aryl group having 6 to 10 carbon atoms such as a phenyl group, a 4-methylphenyl group and a naphthyl group; an alkoxy group having 1 to 4 carbon atoms such as a methoxy group, an ethoxy group, various propoxy groups and various butoxy groups; an acyl group having 1 to 7 carbon atoms such as an acetyl group, a benzoyl group, a formyl group and a pivaloyl group; an alkoxycarbonyl group having 3 to 4 carbon atoms such as a methoxycarbonyl group and an ethoxycarbonyl group; an aryloxycarbonyl group having 7 to 11 carbon atoms such as a phenoxycarbonyl group and a naphthyloxycarbonyl group; and an acyloxy group having 2 to 7 carbon atoms such as an acetoxy group and a benzoyloxy group.

Regarding $—B^{51}-A^{51}-B^{52}—$ of $R^{51}$, the alkanediyl group having 1 to 12 carbon atoms of $B^{51}$ and $B^{52}$ includes those exemplified hereinabove for the alkanediyl group of $R^{21}$. $B^{51}$ and $B^{52}$ may be the same or different.

The arylenediyl group having 6 to 12 carbon atoms of $A^{51}$ includes various phenylene groups, various naphthylene groups and various biphenylene groups, for example, those derived from the exemplifications mentioned hereinabove for the aryl group of $A^{11}$ by removal of one hydrogen atom. $A^{51}$ may have a substituent, and the substituent includes an alkoxy group having 1 to 4 carbon atoms such as a methoxy group, an ethoxy group, various propoxy groups and butoxy groups; a hydroxy group; a nitrogen-containing substituent such as a nitro group and a cyano group; a sulfur-containing substituent such as a sulfo group; and a halogen atom such as a fluorine atom, a chlorine atom, a bromine atom and an iodine atom.

Among —$B^{51}$-$A^{51}$-$B^{52}$— of $R^{51}$, preferred are a phenylene group, a naphthylene group, a biphenylene group and a group represented by the following formula.

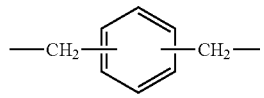

In the present invention, $R^{51}$ is preferably an alkanediyl group having 1 to 12 carbon atoms, a phenylene group, or a methylene group having a phenyl group represented by the following formula as a substituent.

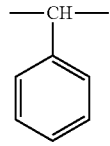

The halogen atom of $R^{52}$ and $R^{53}$ includes a fluorine atom, a chlorine atom, a bromine atom and an iodine atom. The alkyl group having 1 to 6 carbon atoms, and the aryl group having 6 to 12 carbon atoms of $R^{52}$ and $R^{53}$ are the same as those mentioned hereinabove, and the alkoxy group having 1 to 6 carbon atoms thereof includes an aliphatic alkoxy group such as a methoxy group, an ethoxy group, a propoxy group, various butoxy groups, various pentyloxy groups, and various hexyloxy groups. $R^{52}$ and $R^{53}$ may be the same or different.

A case where $R^{52}$ and $R^{53}$ bond to each other to form a cyclic structure means such that the carbons forming the carbon-carbon double bond in the compound 5 bond to each other. In the case where $R^{52}$ and $R^{53}$ bond to each other to form a cyclic structure, $R^{52}$ and $R^{53}$ bonding to each other may form an alkanediyl group having 1 to 12 carbon atoms, and preferred examples of the alkanediyl group having 1 to 12 carbon atoms include those exemplified hereinabove for the alkanediyl group of $R^{21}$. In this case, the carbon number of the alkanediyl group is preferably 2 to 8, more preferably 3 or 4. For example, in the case where the alkanediyl group is a linear alkanediyl group having 3 or 4 carbon atoms, $R^{52}$ and $R^{53}$ form a cyclopentene ring or a cyclohexene ring along with the carbons that form the carbon-carbon double bond in the compound 5.

$R^{52}$ and $R^{53}$ are preferably such that $R^{52}$ is a hydrogen atom and $R^{53}$ is a hydrogen atom or an alkyl group having 1 to 6 carbon atoms, more preferably $R^{52}$ and $R^{53}$ are hydrogen atoms.

Preferred examples of the alkoxy group having 1 to 6 carbon atoms of $R^{54}$ include those exemplified hereinabove as the alkoxy group having 1 to 6 carbon atoms of $R^{52}$ and $R^{53}$. The aryloxy group having 6 to 12 carbon atoms of $R^{54}$ includes those derived from the exemplifications for the aryl group of $A^{11}$ by bonding an oxy group thereto, and examples thereof include a phenyloxy group, a naphthyloxy group, and a biphenyloxy group. The arylalkoxy group having 7 to 15 carbon atoms of $R^{54}$ includes those derived from the exemplifications for the aryl group of $A^{11}$ by bonding an alkoxy group thereto, and examples thereof include a phenylethyloxy group, a benzyloxy group, and a phenylpropionyloxy group.

—$NR^{55}R^{56}$ of $R^{54}$ includes a methylamino group, an ethylamino group, a phenylamino group, an ethylmethylamino group, a dimethylamino group, a diethylamino group, a methylphenylamino group, an ethylphenylamino group and a diphenylamino group.

In —O—$((Y^{51})^{n+})^{1/n}$ of $R^{54}$, $(Y^{51})^{n+}$ indicates an n-valent cation capable of forming a carboxylate salt of the compound 5, and examples thereof include an n-valent cation of a metal selected from an alkali metal, an alkaline earth metal and a transition metal of Group 11 and Group 12 of the Periodic Table, and a cation of an organic base capable of forming a salt with a carboxy group such as an amine. More specifically, examples include cations such as $Li^+$, $Na^+$, $K^+$, $Mg^{2+}$, $Ca^{2+}$, $Ba^{2+}$, $Zn^{2+}$, $CU^{2+}$, $Cu^+$, $Ag^+$, $(NH_4)^+$, $[NH(C_2H_5)_3]^+$, $[NH(C_2H_5)(i\text{-}C_3H_7)_2]^+$, $^+H_3N\text{—}(CH_2)_2\text{—}NH_3^+$, and $^+H_3N\text{—}(CH_2)_6\text{—}NH_3^+$.

Among the above-mentioned $R^{54}$, a hydroxy group or —O—$((Y^{51})^{n+})^{1/n}$ is preferred, and a hydroxy group or —O—$((Y^{51})^{n+})^{1/n}$ where $Y^{51}$ is an alkali metal is more preferred.

Preferred examples of the compound 5 include compounds represented by the following chemical formulae.

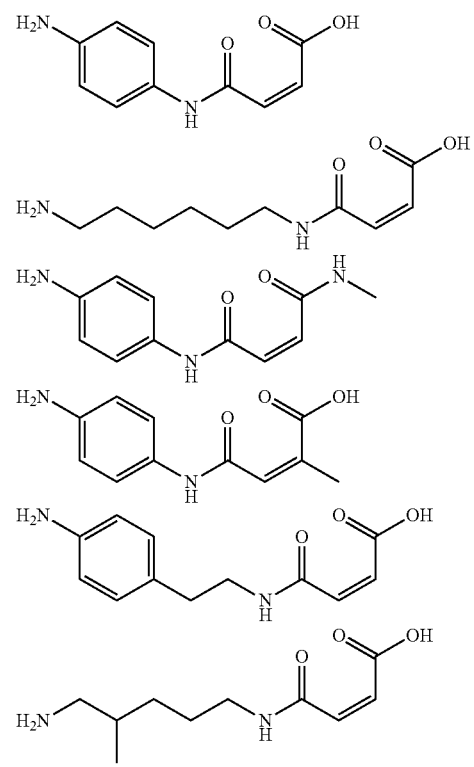

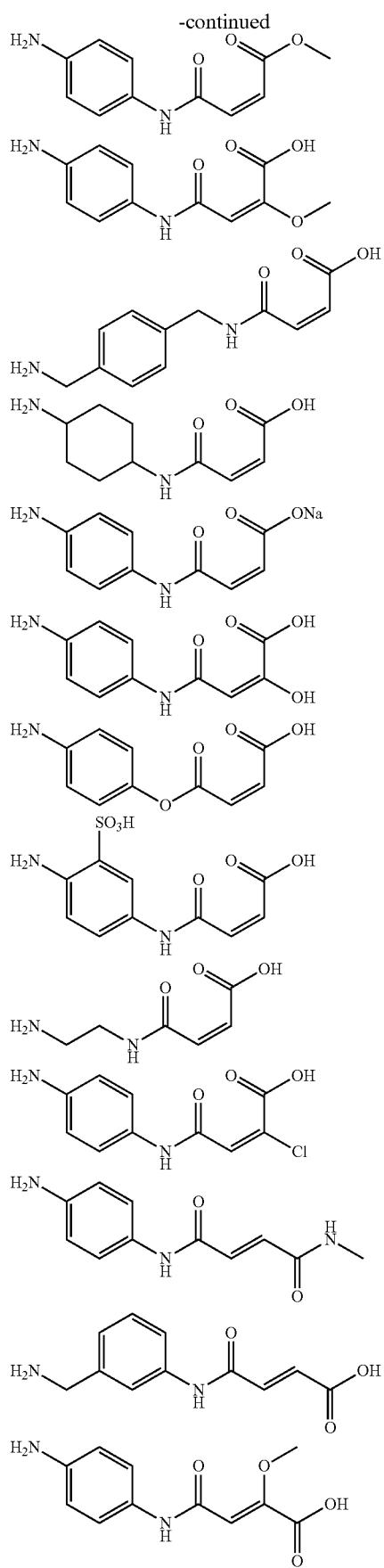
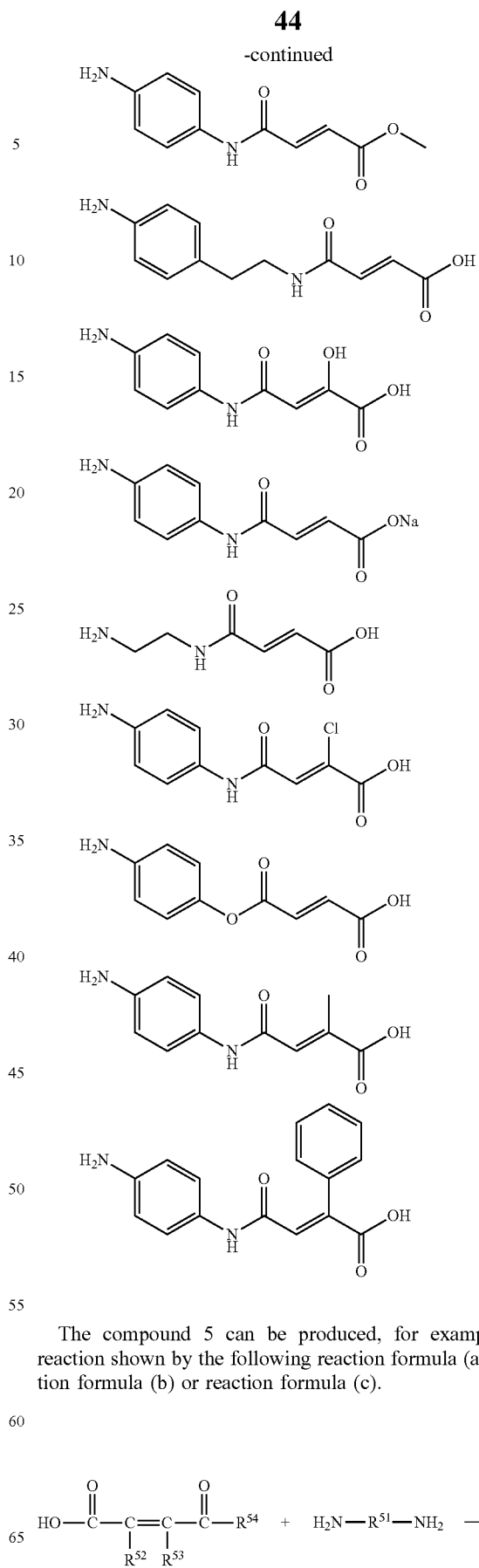
The compound 5 can be produced, for example, by reaction shown by the following reaction formula (a), reaction formula (b) or reaction formula (c).
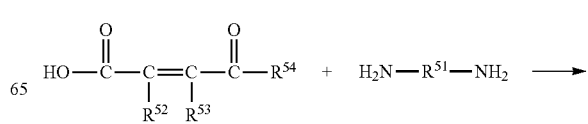
(a)

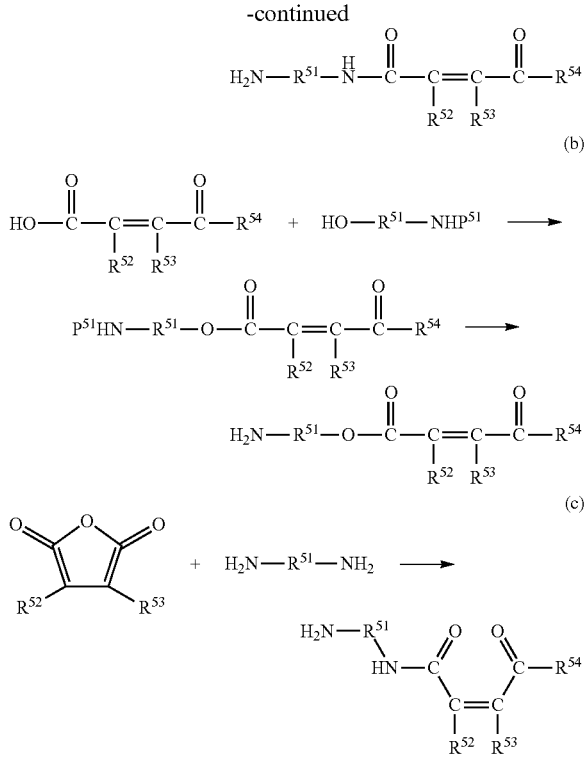

In the reaction formula (a), the reaction formula (b) and the reaction formula (c), $R^{51}$, $R^{52}$, $R^{53}$ and $R^{54}$ each are the same as $R^{51}$, $R^{52}$, $R^{53}$ and $R^{54}$ in the reaction formula (5), respectively, mentioned hereinabove, and $P^{51}$ represents a protective group.

Examples of the protective group of $P^{51}$ in the above reaction formula (b) include a tert-butoxycarbonyl group. In the case where a protective group is used, the protective group can be removed according to an ordinary method.

The compound represented by the general formula (5-1) can be produced, for example, through esterification, amidation or salt formation of the corresponding acid anhydride such as maleic anhydride.

(Compound Represented by General Formula (6))

The carbon black dispersant (C) includes a compound represented by the following general formula (6) (hereinafter may be referred to as "compound 6").

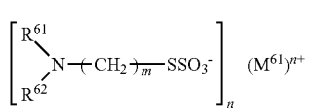

(6)

In the general formula (6), $R^{61}$ and $R^{62}$ each independently represent a hydrogen atom or an alkyl group with 1 to 6 carbon atoms, or bonding to each other to form a cyclic structure; $(M^{61})^{n+}$ represents $H^+$ or an n-valent metal ion; m represents an integer of 2 to 9; n represents an integer of 1 or 2.

In the case where $R^{61}$ and $R^{62}$ each are an alkyl group having 1 to 6 carbon atoms, $R^{61}$ and $R^{62}$ may be the same or different.

In the case where $R^{61}$ and $R^{62}$ bond to each other to form a cyclic structure, $R^{61}$ and $R^{62}$ form a cyclic structure together with the nitrogen atom, and for example, $R^{61}$ and $R^{62}$ may bond to each other to form an alkanediyl group having 1 to 12 carbon atoms. In this case, the alkanediyl group having 1 to 12 carbon atoms is the same as that described hereinabove as one to be formed by $R^{52}$ and $R^{53}$. In the present invention, $R^{61}$ and $R^{62}$ are preferably hydrogen atoms.

$(M^{61})^{n+}$ includes $H^+$, a lithium ion, a sodium ion, a potassium ion, a cesium ion, a magnesium ion, a calcium ion, a strontium ion, a barium ion, a manganese ion, an iron iron, a copper ion, and a zinc ion, and is preferably $H^+$ or an alkali metal ion, more preferably $H^+$ or a sodium ion.

Examples of the compound 6 include an S-(aminoalkyl)thiosulfuric acid, an S-(aminoalkyl)thiosulfate, an S—(N,N-dialkylaminoalkyl)thiosulfuric acid, an S—(N,N-dialkylaminoalkyl)thiosulfate, an S—(N-monoalkylaminoalkyl)thiosulfuric acid, and an S—(N-monoalkylaminoalkyl)thiosulfate, and is preferably an S-aminoalkyl)thiosulfuric acid or an S-(aminoalkyl)thiosulfate.

Here, the S-(aminoalkyl)thiosulfuric acid include S-(aminoethyl)thiosulfuric acid, S-(aminopropyl)thiosulfuric acid, S-(aminobutyl)thiosulfuric acid, S-(aminopentyl)thiosulfuric acid, S-(aminohexyl)thiosulfuric acid, S-(aminoheptyl)thiosulfuric acid, S-(aminooctyl)thiosulfuric acid, and S-(aminononyl)thiosulfuric acid.

The S-(aminoalkyl)thiosulfate includes sodium S-(aminoethyl)thiosulfate, sodium S-(aminopropyl)thiosulfate, sodium S-(aminobutyl)thiosulfate, sodium S-(aminopentyl)thiosulfate, sodium S-(aminohexyl)thiosulfate, sodium S-(aminoheptyl)thiosulfate, sodium S-(aminooctyl)thiosulfate, and sodium S-(aminononyl)thiosulfate.

The S—(N,N-dialkylaminoalkyl)thiosulfuric acid includes S—(N,N-dimethylaminoethyl)thiosulfuric acid, S—(N,N-dimethylaminopropyl)thiosulfuric acid, S—(N,N-dimethylaminobutyl)thiosulfuric acid, S—(N,N-dimethylaminopentyl)thiosulfuric acid, S—(N,N-dimethylaminohexyl)thiosulfuric acid, S—(N,N-dimethylaminoheptyl)thiosulfuric acid, S—(N,N-dimethylaminooctyl)thiosulfuric acid, and S—(N,N-dimethylaminononyl)thiosulfuric acid.

The S—(N,N-dialkylaminoalkyl)thiosulfate includes sodium S—(N,N-dimethylaminoethyl)thiosulfate, sodium S—(N,N-dimethylaminopropyl)thiosulfate, sodium S—(N,N-dimethylaminobutyl)thiosulfate, sodium S—(N,N-dimethylaminopentyl)thiosulfate, sodium S—(N,N-dimethylaminohexyl)thiosulfate, sodium S—(N,N-dimethylaminoheptyl)thiosulfate, sodium S—(N,N-dimethylaminooctyl)thiosulfate, and sodium S—(N,N-dimethylaminononyl)thiosulfate.

The S—(N-monoalkylaminoalkyl)thiosulfuric acid includes S—(N-methylaminoethyl)thiosulfuric acid, S—(N-methylaminopropyl)thiosulfuric acid, S—(N-methylaminobutyl)thiosulfuric acid, S—(N-methylaminopentyl)thiosulfuric acid, S—(N-methylaminohexyl)thiosulfuric acid, S—(N-methylaminoheptyl)thiosulfuric acid, S—(N-methylaminooctyl)thiosulfuric acid, and S—(N-methylaminononyl)thiosulfuric acid.

The S—(N-monoalkylaminoalkyl)thiosulfate includes sodium S—(N-methylaminoethyl)thiosulfate, sodium S—(N-methylaminopropyl)thiosulfate, sodium S—(N-methylaminobutyl)thiosulfate, sodium S—(N-methylaminopentyl)thiosulfate, sodium S—(N-methylaminohexyl)thiosulfate, sodium S—(N-methylaminoheptyl)thiosulfate, sodium S—(N-methylaminooctyl)thiosulfate, and sodium S—(N-methylaminononyl)thiosulfate.

The compound 6 can be produced, for example, by reacting a 3-chloropropylamine hydrochloride and a sodium thiosulfate. A metal salt of the compound 6 may be neutralized with, for example, a protonic acid such as hydrochloric acid or sulfuric acid to give the compound 6. A metal salt of the compound 6 can be produced, for example, according to a known method such as a method of reacting a 3-halopropylamine and a sodium thiosulfate, or a method of reacting a phthalimide potassium salt and a 1,3-dihalopropane, then reacting the resultant compound with a sodium thiosulfate, and thereafter hydrolyzing the resultant compound.

Using any of the compounds 1 to 6 represented by the general formulae (1) to (6) as the carbon black dispersant (C), an effect of increasing the dispersibility of the carbon black (B) can be secured and, above all, use of the compounds 1 to 3 represented by the general formulae (1) to (3) is preferred, and use of the compounds 1 and 2 represented by the general formulae (1) and (2) is more preferred. This is because more improving a low heat generation property can reduce rolling resistance of tire and can improve low fuel consumption, and in addition excellent abrasion resistance can be secured. For the carbon black dispersant (C), one alone or plural kinds of the compounds 1 to 6 represented by the general formulae (1) to (6) can be used either singly or as combined.

The content of the carbon black dispersant (C) relative to 100 parts by mass of the rubber component (A) is preferably 0.1 parts by mass or more, more preferably 0.3 parts by mass or more, even more preferably 0.5 parts by mass or more, and the upper limit is preferably 10 parts by mass or less, more preferably 8 parts by mass or less, even more preferably 3 parts by mass or less. When the content of the carbon black dispersant (C) falls within the above range, the crack resistance and the tear resistance of the resultant rubber composition can be efficiently improved, and in addition, since the low heat generation property thereof improves, rolling resistance of tires can be thereby reduced and low fuel consumption can be improved.

<<Other Additives>>

The rubber composition for tires of the present invention can optionally contain, in addition to the above-mentioned rubber component (A), carbon black (B), and carbon black dispersant (C), any known additives, for example, a filler such as silica, aluminum hydroxide, clay, alumina, talc, mica, kaolin, glass balloons, glass beads, calcium carbonate, magnesium carbonate, magnesium hydroxide, magnesium oxide, titanium oxide, potassium titanate, and barium sulfate; a crosslinking agent such as a sulfur-based crosslinking agent, organic peroxide-based crosslinking agent, an inorganic crosslinking agent, a polyamine crosslinking agent, a resin crosslinking agent, a sulfur compound-based crosslinking agent, or an oxime-nitrosoamine-based crosslinking agent, preferably a sulfur-based crosslinking agent (vulcanizing agent); a vulcanization accelerator such as a guanidine-based, an aldehyde-amine-based, an aldehyde-ammonia-based, a thiazole-based, a sulfenamide-based, a thiourea-based, a thiuram-based, a dithiocarbamate-based or a xanthate-based vulcanization accelerator; and any other compounding agent such as a softener, a vulcanization aid, a colorant, a flame retardant, a lubricant, a foaming agent, a plasticizer, a processing aid, an antioxidant, an antiaging agent, a scorch inhibitor, a UV protector, an antistatic agent, and a color protector.

[Tire]

The tire of the present invention is not specifically limited so far as it uses the rubber composition for tires of the present invention, and can be appropriately selected depending on the intended purpose. The tire uses the rubber composition of the present invention, and is therefore excellent in low fuel consumption and also excellent in crack resistance and tear resistance.

The site of the tire to which the rubber composition of the present invention is applied is not specifically limited, and can be appropriately selected depending on the intended purpose. For example, the site includes a tread, a base tread, a side wall, a side-reinforcing rubber, and bead filler. Among these, use of the rubber composition of the present invention for a tread is advantageous from the viewpoint of low fuel consumption.

As a method for producing the tire, any ordinary method is employable. For example, members generally used in tire production, such as a carcass layer, a belt layer and a tread layer formed of at least one material selected from a rubber composition for tires of the present invention and a cord are layered in order, on a drum for tire formation, and then the drum is removed to give a green tire. Next, the green tire is vulcanized under heat according to an ordinary method to produce a desired tire (for example, pneumatic tire).

EXAMPLES

The present invention is described in more detail with reference to Examples given below, but the present invention is not restricted at all by these Examples.

Preparation Example 1: Synthesis of Synthetic Isoprene A 500 g of a hexane solution containing 100 g (1.47 mol) of isoprene was added to a fully-dried reactor (volume: 2 L, stainless-steel).

Apart from this, in a glove box in a nitrogen atmosphere, 10.0 μmol of trisbistrimethylsilylamide gadolinium (Gd[N(SiMe$_3$)$_2$]$_3$), 20 μmol of benzylindene, and 0.5 mmol of diisobutylaluminum hydride were added to a glass container, and these were dissolved in 10 mL of hexane. Next, MMAO (trade name "MMAO-3A", from Tosoh Finechem Corporation) was added thereto in such a manner that the molar ratio of aluminum in MMAO relative to gadolinium could be 250, and further 20 μmol of diethylaluminum chloride was added thereto to prepare a polymerization catalyst composition.

The resultant polymerization catalyst composition was taken out of the glove box, and the total amount thereof was added to the above reactor with isoprene added thereto. The reaction system was kept at 50° C. for 180 minutes to carry out isoprene polymerization. Subsequently, 5 mL of an isopropanol solution of 2,2'-methylene-bis(6-tert-butyl-4-ethylphenol) (trade name "Nocrac NS-5" from Ouchi Shinko Chemical Industrial Co., Ltd.) (5% by mass) was added to the reaction system to stop the polymerization reaction. A large amount of methanol was added to the reactor to precipitate and separate the reaction product, which was further dried in vacuum at 60° C. to give a synthetic isoprene (yield: 98 g).

Preparation Example 2: Synthesis of Synthetic Isoprene B 500 g of a hexane solution containing 100 g (1.47 mol) of isoprene is added to a fully-dried reactor (volume: 2 L, stainless-steel).

Apart from this, in a glove box in a nitrogen atmosphere, 20.0 μmol of trisbistrimethylsilylamide gadolinium (Gd[N(SiMe$_3$)$_2$]$_3$), 40 μmol of benzylindene, and 0.5 mmol of diisobutylaluminum hydride are added to a glass container, and these were dissolved in 10 mL of hexane. Next, MMAO (trade name "MMAO-3A", from Tosoh Finechem Corporation) is added thereto in such a manner that the molar ratio of aluminum in MMAO relative to gadolinium can be 300, and further 40 µmol of diethylaluminum chloride is added thereto to prepare a polymerization catalyst composition.

The resultant polymerization catalyst composition is taken out of the glove box, and the total amount thereof is added to the above reactor with isoprene added thereto. The reaction system is kept at 50° C. for 180 minutes to carry out isoprene polymerization. Subsequently, 5 mL of an isopropanol solution of 2,2'-methylene-bis(6-tert-butyl-4-ethylphenol) (trade name "Nocrac NS-5" from Ouchi Shinko Chemical Industrial Co., Ltd.) (5% by mass) is added to the reaction system to stop the polymerization reaction. A large amount of methanol is added to the reactor to precipitate and separate the reaction product, which is further dried in vacuum at 60° C. to give a synthetic isoprene (yield: 99 g).

The synthetic isoprene A produced in Preparation Example 1 was analyzed to measure the cis-1,4 bond content, the weight-average molecular weight (Mw) and the molecular weight distribution (Mw/Mn) thereof and the proportion of components having a molecular weight of 200,000 or more (or less than 200,000) therein according to the methods mentioned below.

(Measurement of Cis-1,4 Bond Content)

From the integration ratio in the $^1$H-NMR spectrum (1,2-vinyl bond content) and the $^{13}$C-NMR spectrum (content ratio of cis-1,4 bond to trans-1,4 bond), the cis-1,4 bond content (%) in the entire synthetic isoprene-derived unit was determined. The cis-1,4 bond content (%) are shown in Table 1.

(Measurement of Weight-Average Molecular Weight (Mw), Molecular Weight Distribution (Mw/Mn) and Proportion of Components Having a Molecular Weight of 200,000 or More (or Less than 200,000)

According to gel permeation chromatography [GPC: HLC-8220GPC/HT from Tosoh Corporation, column: SHO-DEXs KF807L from Showa Denko K.K., two columns, detector: differential refractive index detector (RI)] based on a monodispersed polystyrene as a standard, the polystyrene-equivalent weight-average molecular weight (Mw) and the molecular weight distribution (Mw/Mn) were determined, and in addition, the proportion of components having a molecular weight of 200,000 or more (or less than 200,000) in these was measured. The measurement temperature is 40° C. The weight-average molecular weight (Mw) and the molecular weight distribution (Mw/Mn), and the proportion of components having a molecular weight of 200,000 or more (or less than 200,000) therein are shown in Table 1.

The synthetic isoprene B produced in Preparation Example 2 and IR used in Comparative Examples are analyzed to measure the cis-1,4 bond content, the weight-average molecular weight (Mw) and the molecular weight distribution (Mw/Mn) thereof and the proportion of components having a molecular weight of 200,000 or more (or less than 200,000) therein according to the methods mentioned below.

(Measurement of Cis-1,4 Bond Content)

From the integration ratio in the $^1$H-NMR spectrum (1,2-vinyl bond content) and the $^{13}$C-NMR spectrum (content ratio of cis-1,4 bond to trans-1,4 bond), the cis-1,4 bond content (%) in the entire synthetic isoprene-derived unit is determined. The cis-1,4 bond content (%) are shown in Table 1.

(Measurement of Weight-Average Molecular Weight (Mw), Molecular Weight Distribution (Mw/Mn) and Proportion of Components Having a Molecular Weight of 200,000 or More (or Less than 200,000)

According to gel permeation chromatography [GPC: HLC-8220GPC/HT from Tosoh Corporation, column: SHO-DEXs KF807L from Showa Denko K.K., two columns, detector: differential refractive index detector (RI)] based on a monodispersed polystyrene as a standard, the polystyrene-equivalent weight-average molecular weight (Mw) and the molecular weight distribution (Mw/Mn) are determined, and in addition, the proportion of components having a molecular weight of 200,000 or more (or less than 200,000) in these is measured. The measurement temperature is 40° C. The weight-average molecular weight (Mw) and the molecular weight distribution (Mw/Mn), and the proportion of components having a molecular weight of 200,000 or more (or less than 200,000) therein are shown in Table 1.

TABLE 1

| | Synthetic Isoprene | | |
|---|---|---|---|
| | A | B | IR |
| 1,4-Cis Bond Content (%) | 98.5 | 99.2 | 98.5 |
| Weight-Average Molecular Weight (Mw) | 1,640,000 | 880,000 | 1,600,000 |
| Molecular Weight Distribution (Mw/Mn) | 2.05 | 2.03 | 3.65 |
| Proportion of Components having a molecular weight of less than 200,000 (%) | 3 | 11 | 10 |
| Proportion of Components having a molecular weight of 200,000 or more (%) | 97 | 89 | 90 |

Examples 1 to 2 Comparative Examples 1 to 3

Rubber compositions each having the compounding formulation shown in Table 2 are prepared, and vulcanized at 160° C. for 30 minutes. The resultant vulcanized rubber compositions are tested for loss tangent (tan δ) and crack resistance according to the methods mentioned below. The results are shown in Table 2.

(Evaluation of Low Fuel Consumption: Measurement of Loss Tangent (Tan δ))

Using a spectrometer from Ueshima Seisakusho Co., Ltd. (dynamic viscoelasticity measurement tester), the loss tangent (tan δ) of a vulcanized rubber using each of the rubber composition of Examples and Comparative Examples is measured at a frequency of 52 Hz, an initial strain of 10%, a measurement temperature of 60° C., and a dynamic strain of 1%. The measured value in Comparative Example 1 is standardized to be 100. A smaller value means a lower loss tangent (tan δ), therefore indicating that the samples having a smaller value are excellent in low heat generation property, and that, since the rolling resistance of the rubber composition is small, the samples are excellent in low fuel consumption.

(Evaluation of Crack Resistance)

According to JIS K6257, the vulcanized rubber using each of the rubber composition of Examples and Comparative Examples is thermally aged at 100° C. for 48 hours, and a 0.5-mm crack is made in JIS No. 3 specimens thereof at the central part thereof. The specimens are given repeated fatigue at a strain of 50 to 100% at 80° C., and the number of fatigues given thereto until the specimen is broken is counted. The measured value in Comparative Example 1 is standardized to be 100. Samples having a larger value have more excellent crack resistance.

(Evaluation of Tear Resistance)

According to JIS K6252, the vulcanized rubber using each of the rubber composition of Examples and Comparative Examples is thermally aged at 80° C. for 2 weeks, and trousers test pieces thereof are tested at a speed of 100 mm/min. The measured value in Comparative Example 1 is standardized to be 100. Samples having a larger value have more excellent tear resistance.

TABLE 2

|  |  | Example | | Comparative Example | | |
|---|---|---|---|---|---|---|
|  |  | 1 | 2 | 1 | 2 | 3 |
| Compounding Formulation (part by mass) | Synthetic Polyisoprene A | 60.0 | 0.0 | 60.0 | 0.0 | 0.0 |
|  | Synthetic Polyisoprene B | 0.0 | 60.0 | 0.0 | 0.0 | 0.0 |
|  | Synthetic Polyisoprene C | 0.0 | 0.0 | 0.0 | 0.0 | 0.0 |
|  | NR | 0.0 | 0.0 | 0.0 | 60.0 | 0.0 |
|  | IR | 0.0 | 0.0 | 0.0 | 0.0 | 60.0 |
|  | BR | 40.0 | 40.0 | 40.0 | 40.0 | 40.0 |
|  | Carbon Black | 50.0 | 50.0 | 50.0 | 50.0 | 50.0 |
|  | Carbon Black Dispersant | 1.0 | 1.0 | 0.0 | 1.0 | 1.0 |
|  | Stearic Acid | 2.0 | 2.0 | 2.0 | 2.0 | 2.0 |
|  | Zinc Oxide | 3.5 | 3.5 | 3.5 | 3.5 | 3.5 |
|  | Antiaging Agent A | 1.5 | 1.5 | 1.5 | 1.5 | 1.5 |
|  | Antiaging Agent B | 0.3 | 0.3 | 0.3 | 0.3 | 0.3 |
|  | WAX | 1.0 | 1.0 | 1.0 | 1.0 | 1.0 |
|  | Vulcanization Accelerator | 1.3 | 1.3 | 1.3 | 1.3 | 1.3 |
|  | Sulfur | 1.0 | 1.0 | 1.0 | 1.0 | 1.0 |
| Evaluation | Low Fuel Consumption (low heat generation property) | 93 | 98 | 100 | 111 | 103 |
|  | Crack Resistance | 115 | 103 | 100 | 100 | 47 |
|  | Tear Resistance | 170 | 121 | 100 | 117 | 105 |

The components used in Examples and Comparative Examples and shown in Table 2 are as follows.

Synthetic isoprenes A to B: Synthetic isoprene prepared in Preparation Examples 1 to 2.

NR: RSS #3 grade

IR: Polyisoprene rubber (trade name "Nipol IR2200", from Zeon Corporation)

BR: Polybutadiene rubber (trade name "150L", from Ube Industries, Ltd.)

Carbon black: nitrogen adsorption specific surface area of 139 m$^2$/g, DBP oil absorption amount of 140 ml/100 g Carbon black dispersant: 3-Hydroxy-N'-(1,3-dimethyl-butylidene)-2-naphthoic acid hydrazide Antiaging agent A: N-phenyl-N'-(1,3-dimethylbutyl)-p-phenylenediamine (trade name "Nocrac 6C", from Ouchi Shinko Chemical Industrial Co., Ltd.

Antiaging agent B: Polymerized 2,2,4-trimethyl-1,2-di-hydroquinoline

WAX: trade name "Suntight A", from Seiko Chemical Co., Ltd.

Vulcanization accelerator: N-Cyclohexyl-2-benzothiaz-olylsulfenamide

From Table 2, it is confirmed that the rubber compositions for tires of the present invention in Examples 1 to 3 containing a rubber component (A), a carbon black (B) and a carbon black dispersant (C) are excellent in low fuel consumption and have crack resistance and tear resistance. On the other hand, it could not be said that the rubber composition in Comparative Example 1 not containing a carbon black dispersant (B), and the rubber compositions in Comparative Examples 2 and 3 not containing a synthetic isoprene as a rubber component (A) are excellent in low fuel consumption and have crack resistance and tear resistance.

INDUSTRIAL APPLICABILITY

According to the present invention, there can be provided a rubber composition for tires and a tire excellent in low fuel consumption and having crack resistance and tear resistance.

The invention claimed is:

1. A rubber composition for tires, comprising a rubber component (A) that contains a synthetic isoprene having a weight-average molecular weight (Mw) of 800,000 or more, a molecular weight distribution (Mw/Mn) of 2.5 or less, and a cis-1,4-bond content of 96% or more, a carbon black (B), and a carbon black dispersant (C) of at least one selected from a compound represented by any of the following general formulae (1) to (6), and a salt, a solvate and a solvate of the salt of a compound represented by the following general formula (5):

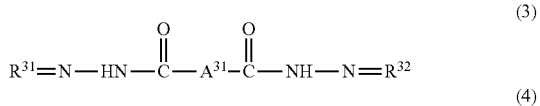

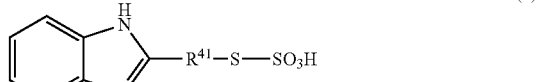

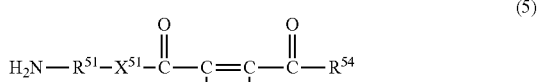

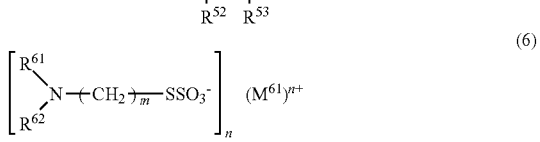

wherein,
in the general formula (1), $A^{11}$ represents an aryl group, a hydantoin skeleton-having group or a linear hydrocarbon group with 1 to 18 carbon atoms, which may have at least one polar group; $R^{11}$ and $R^{12}$ each independently represent a hydrogen atom, an acyl group, an amide group, an alkyl group, a cycloalkyl group or an aryl group;

in the general formula (2), $A^{21}$ represents an aryl group, a hydantoin skeleton-having group or a linear hydrocarbon group with 1 to 18 carbon atoms, which may have at least one polar group; $R^{21}$ represents an alkanediyl group, a cycloalkanediyl group or an arenediyl group;

in the general formula (3), $A^{31}$ represents an arenediyl group, a hydantoin skeleton-having group or a linear hydrocarbon group with 1 to 18 carbon atoms, which may have at least one polar group; $R^{31}$ and $R^{32}$ each independently represent an alkanediyl group, a cycloalkanediyl group or an arenediyl group;

in the general formula (4), $R^{41}$ represents an alkanediyl group with 1 to 6 carbon atoms;

in the general formula (5), $R^{51}$ represents an alkanediyl group with 1 to 12 carbon atoms, a cycloalkanediyl group with 3 to 12 carbon atoms, or —$B^{51}$-$A^{51}$-$B^{52}$—; $A^{51}$ represents an arenediyl group with 6 to 12 carbon atoms; $B^{51}$ and $B^{52}$ each independently represent a single bond or an alkanediyl group with 1 to 12 carbon atoms; $R^{52}$ and $R^{53}$ each independently represent a hydrogen atom, a halogen atom, an alkyl group with 1 to 6 carbon atoms, an aryl group with 6 to 12 carbon atoms, a hydroxy group, or an alkoxy group with 1 to 6 carbon atoms, or bonding to each other to form a cyclic structure; $R^{54}$ represents a hydroxy group, an alkoxy group with 1 to 6 carbon atoms, an aryloxy group with 6 to 12 carbon atoms, an arylalkoxy group with 7 to 15 carbon atoms, —$NR^{55}R^{56}$ or —O—$((Y^{51})^{n+})^{1/n}$; $R^{55}$ and $R^{56}$ each independently represent a hydrogen atom, an alkyl group with 1 to 6 carbon atoms, or an aryl group with 6 to 12 carbon atoms; $(Y^{51})^{n+}$ represents an n-valent cation capable of forming a carboxylate salt; and $X^{51}$ represents —NH— or —O—; and in the general formula (6), $R^{61}$ and $R^{62}$ each independently represent a hydrogen atom or an alkyl group with 1 to 6 carbon atoms, or bonding to each other to form a cyclic structure; $(M^{61})^{n+}$ represents $H^+$ or an n-valent metal ion; m represents an integer of 2 to 9; and n represents an integer of 1 or 2; and wherein the content of components having a molecular weight of less than 200,000 in the synthetic isoprene is less than 10% by mass.

2. The rubber composition for tires according to claim 1, wherein the content of the synthetic isoprene in the rubber component (A) is 30% by mass or more and 100% by mass or less.

3. The rubber composition for tires according to claim 1, wherein the content of the carbon black (B) is 20 parts by mass or more and 100 parts by mass or less relative to 100 parts by mass of the rubber component (A).

4. The rubber composition for tires according to claim 1, wherein the carbon black dispersant (C) is at least one selected from the compounds represented by the general formulae (1) to (3).

5. The rubber composition for tires according to claim 4, wherein, in the general formulae (1) to (3), $A^{11}$ and $A^{21}$ each are independently an aryl group having at least one polar group, and $A^{31}$ is an arenediyl group.

6. The rubber composition for tires according to claim 5, wherein the polar group is a group selected from an amino group, a hydroxy group and a nitro group.

7. The rubber composition for tires according to claim 4, wherein, in the general formulae (1) to (3), $R^{11}$ and $R^{12}$ each are independently a hydrogen atom or an alkyl group, $R^{21}$ is an alkanediyl group, and $R^{31}$ and $R^{32}$ each are independently an alkanediyl group.

8. The rubber composition for tires according to claim 1, wherein the content of the carbon black dispersant (C) is 0.1 parts by mass or more and 10 parts by mass or less relative to 100 parts by mass of the rubber component (A).

9. A tire using a rubber composition of claim 1.

10. A tire using a rubber composition of claim 2.

11. The rubber composition for tires according to claim 2, wherein the content of the carbon black (B) is 20 parts by mass or more and 100 parts by mass or less relative to 100 parts by mass of the rubber component (A).

12. The rubber composition for tires according to claim 2, wherein the carbon black dispersant (C) is at least one selected from the compounds represented by the general formulae (1) to (3).

13. The rubber composition for tires according to claim 2, wherein the content of the carbon black dispersant (C) is 0.1 parts by mass or more and 10 parts by mass or less relative to 100 parts by mass of the rubber component (A).

14. The rubber composition for tires according to claim 3, wherein the carbon black dispersant (C) is at least one selected from the compounds represented by the general formulae (1) to (3).

* * * * *